(12) United States Patent
Akamine et al.

(10) Patent No.: US 12,498,459 B2
(45) Date of Patent: Dec. 16, 2025

(54) RADAR APPARATUS

(71) Applicant: DENSO CORPORATION, Kariya (JP)

(72) Inventors: Yusuke Akamine, Nisshin (JP); Takuya Takayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 427 days.

(21) Appl. No.: 18/301,617

(22) Filed: Apr. 17, 2023

(65) Prior Publication Data

US 2023/0258773 A1 Aug. 17, 2023

Related U.S. Application Data

(63) Continuation of application No. PCT/JP2021/037918, filed on Oct. 13, 2021.

(30) Foreign Application Priority Data

Oct. 19, 2020 (JP) .................... 2020-175366

(51) Int. Cl.
*G01S 7/41* (2006.01)
*G01S 13/72* (2006.01)

(52) U.S. Cl.
CPC .............. *G01S 7/415* (2013.01); *G01S 7/414* (2013.01); *G01S 13/726* (2013.01)

(58) Field of Classification Search
CPC ........ G01S 7/415; G01S 7/414; G01S 13/726; G01S 13/34; G01S 13/52; G01S 13/584; G01S 13/931
See application file for complete search history.

(56) References Cited

U.S. PATENT DOCUMENTS

2017/0115386 A1* 4/2017 Morinaga .......... G01S 13/931
2021/0003695 A1 1/2021 Akamine et al.

FOREIGN PATENT DOCUMENTS

WO WO-2019182043 A1 * 9/2019 ............. G01S 13/60

* cited by examiner

*Primary Examiner* — Bernarr E Gregory
*Assistant Examiner* — Juliana Cross
(74) *Attorney, Agent, or Firm* — Maschoff Brennan

(57) ABSTRACT

A radar apparatus, mounted to a vehicle, includes: a transmitting unit that transmits a transmission signal at a set repetition cycle; and a receiving unit that receives a reflection signal reflected by at least one object. The radar apparatus calculates a velocity residual of each of at least one target object, which is a difference between a velocity prediction value and a velocity measurement value. Based on a magnitude of variation in the velocity residual in time series of each of at least one target object, the radar apparatus calculates an evaluation value of each of at least one target object, which corresponds to a probability of each of at least one target object being a folding ghost. Based on the evaluation value of each of at least one target object, the radar apparatus determines whether each of at least one target object is a folding ghost.

20 Claims, 23 Drawing Sheets

FIG.4
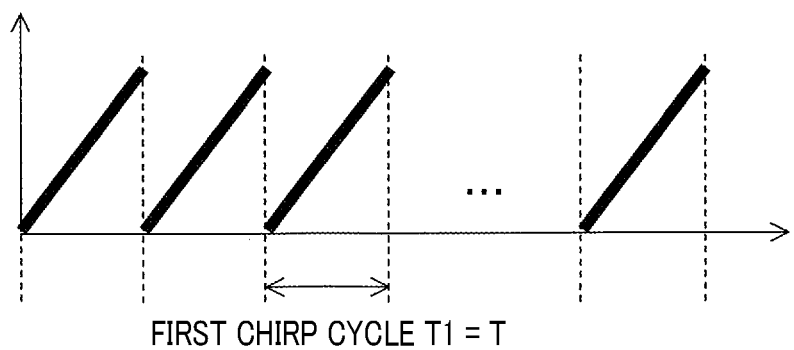
FIRST CHIRP CYCLE T1 = T
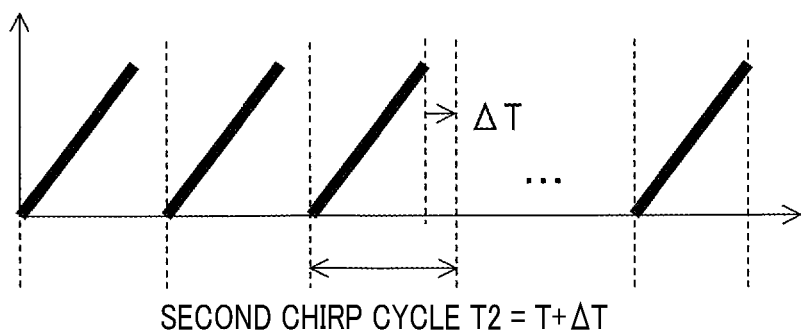
SECOND CHIRP CYCLE T2 = T+ΔT $$V_o = V - 2V_{max} \cdot m$$

$V_o$: DETECTION VELOCITY
$V$: TRUE VELOCITY VALUE
$V_{max}$: MAXIMUM DETECTION VELOCITY
$m$: NUMBER OF TIMES OF FOLDING

FIG.13
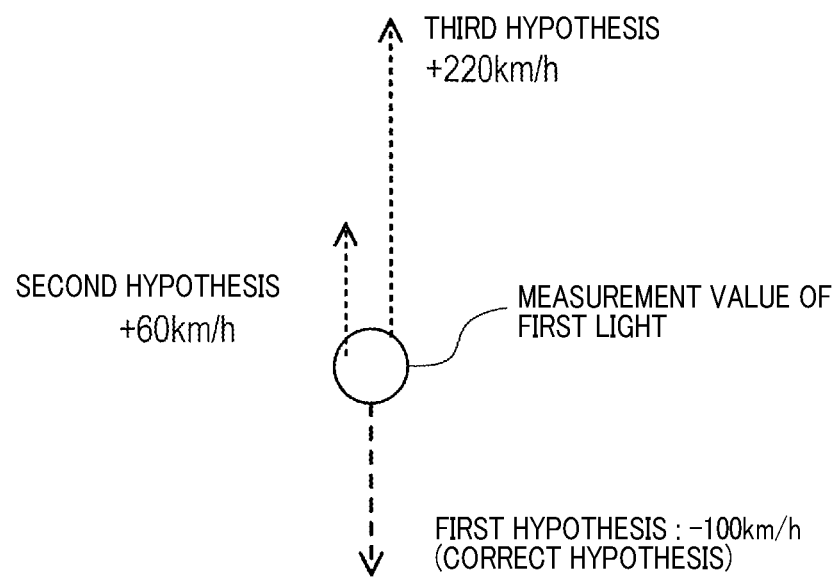
60

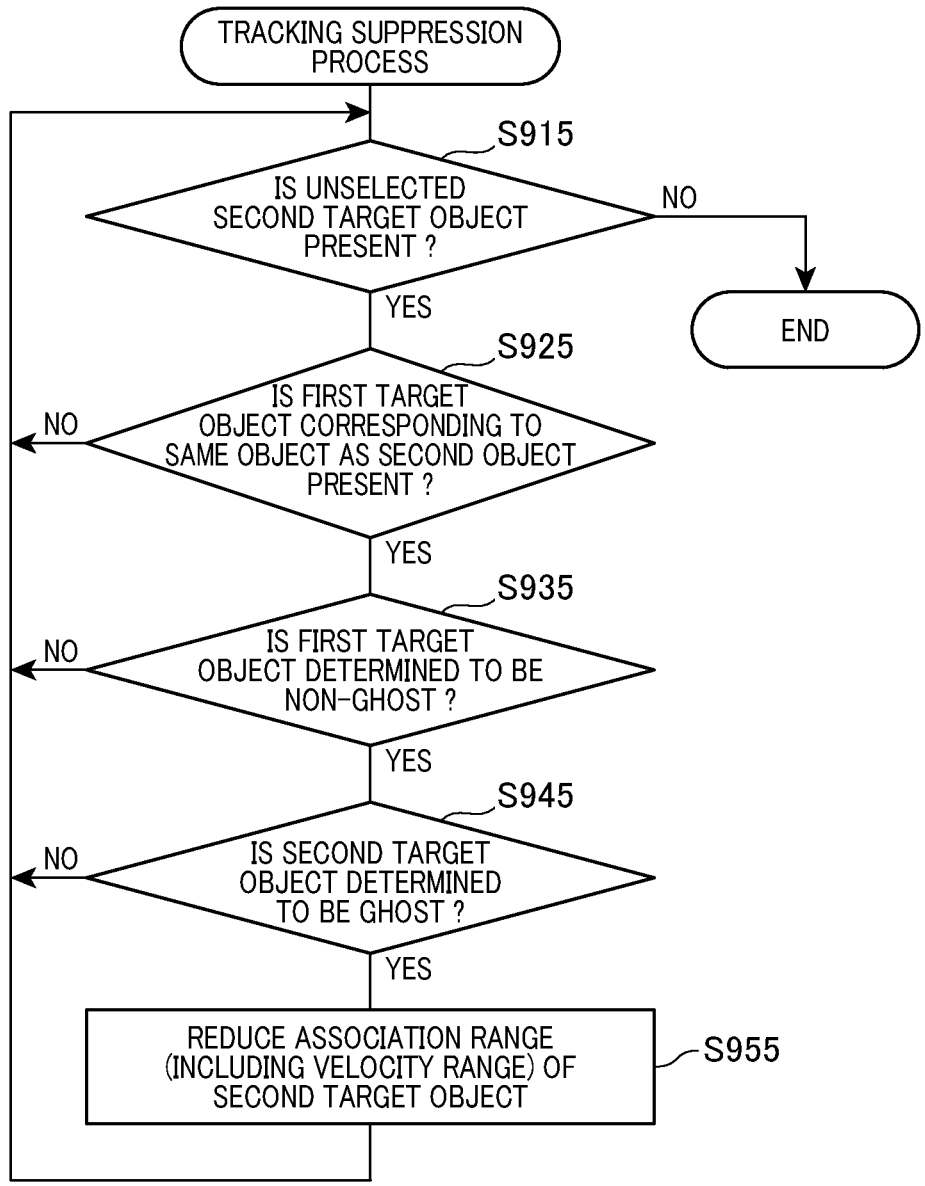

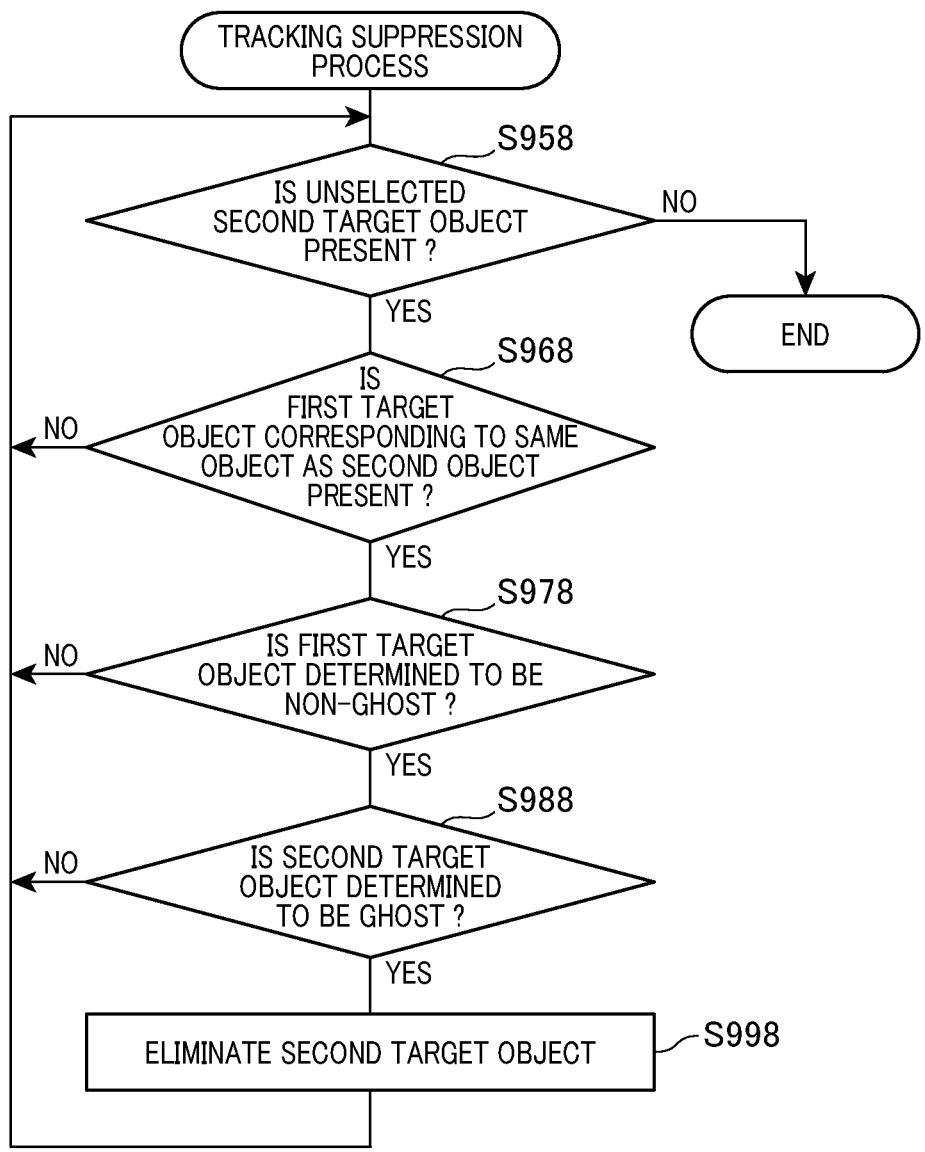

RADAR APPARATUS

CROSS-REFERENCE TO RELATED APPLICATION

The present application is a continuation application of International Application No. PCT/JP2021/037918, filed on Oct. 13, 2021, which claims priority to Japanese Patent Application No. 2020-175366, filed on Oct. 19, 2020. The contents of these applications are incorporated herein by reference in their entirety.

BACKGROUND

Technical Field

The present disclosure relates to a radar apparatus.

Related Art

When an object is tracked using a radar apparatus, a relative velocity of an observed object may have ambiguity. For example, when the relative velocity is calculated from a phase rotation of a frequency component that is continuously detected for the same object, an actual phase may be $\varphi+2\pi \times m$ (m being an integer) relative to a detected phase $\varphi$, and thus the relative velocity cannot be identified.

SUMMARY

One aspect of the present disclosure provides a radar apparatus that is mounted to a vehicle and includes a transmitting unit and a receiving unit. The transmitting unit transmits a transmission signal that is a pulse signal or a chirp signal, at a repetition cycle that is set. The receiving unit receives a reflection signal that is generated by the transmission signal transmitted by the transmitting unit being reflected by at least one object.

The radar apparatus sets the repetition cycle that differs from the repetition cycle of a preceding processing cycle as the repetition cycle of a next processing cycle. The radar apparatus detects at least one target object signal that corresponds to at least one target object from the reflection signal received. The radar apparatus calculates at least one target object measurement value from the at least one target object signal detected. Each of the at least one target object measurement value includes, as an element, a velocity measurement value that takes into consideration velocity folding of the at least one target object.

The radar apparatus tracks each of the at least one target object from a time series of the at least one target object measurement value calculated. The radar apparatus calculates a target object prediction value that corresponds to a current state of each of the at least one target object from a target object estimation value that corresponds to a past state of each of the at least one target object. The radar apparatus associates the target object prediction value with the target object measurement value and calculate the target object estimation value that corresponds to the current state of each of the at least one target object, based on the target object prediction value and the target object measurement value that are associated with each other. The target object prediction value includes a velocity prediction value as an element.

The radar apparatus calculates a velocity residual of each of the at least one target object. The velocity residual is a difference between the velocity prediction value and the velocity measurement value. The radar apparatus calculates an evaluation value of each of the at least one target object based on a magnitude of variation in the velocity residual in time series of each of the at least one target object. The evaluation value corresponds to a probability of each of the at least one target object being a folding ghost. The radar apparatus determines whether each of the at least one target object is a folding ghost based on the evaluation value of each of the at least one target object.

BRIEF DESCRIPTION OF THE DRAWINGS

In the accompanying drawings:

FIG. 4 is a diagram illustrating a transmission signal that has two types of chirp cycles according to the first embodiment;

FIG. 13 is a diagram illustrating an measurement value of the first light and three hypotheses generated from the measurement value;

FIG. 24 is a subroutine illustrating a tracking suppression process according to the fourth embodiment; and FIG. 25 is a subroutine illustrating another example of the tracking suppression process according to the fourth embodiment.

DESCRIPTION OF THE EMBODIMENTS

Figure 1:
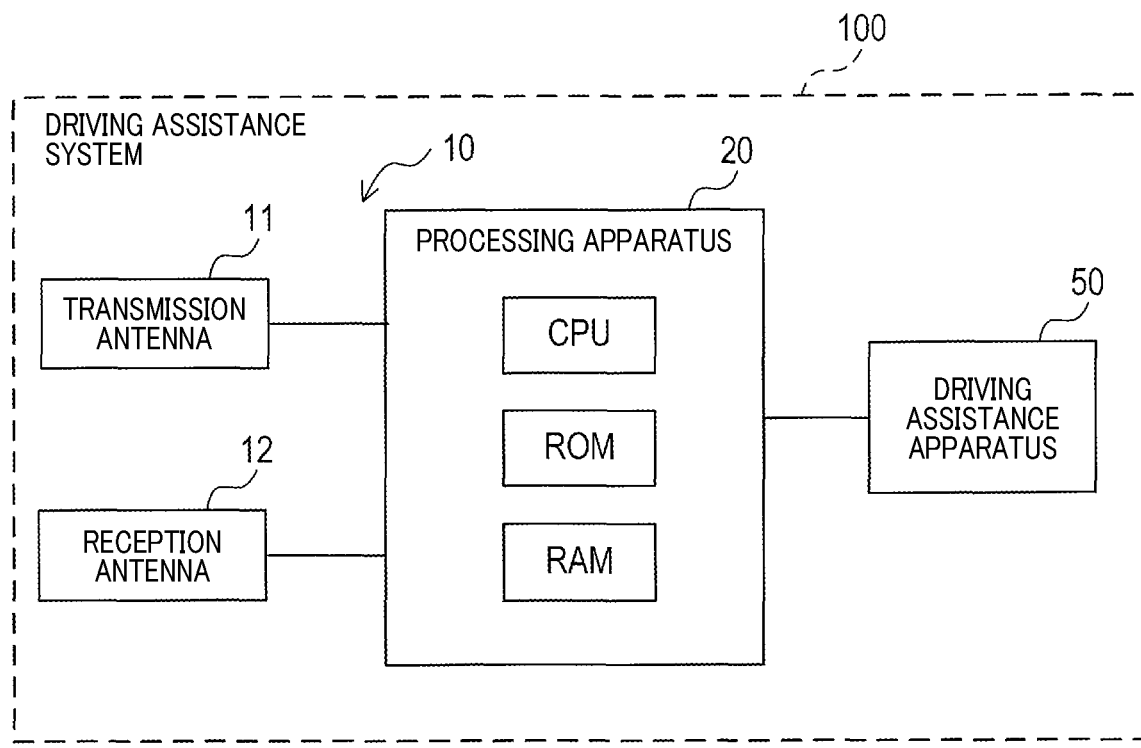
FIG. 1 is a block diagram illustrating a configuration of a driving assistance system according to a first embodiment.

A radar apparatus described in JP 2019-168449 A identifies a true relative velocity by tracking a plurality of hypotheses in which the ambiguity of the relative velocity is assumed. Differing number of times of folding m are assumed in the plurality of hypotheses. Specifically, the above-described radar apparatus calculates respective likelihoods of the plurality of hypotheses and selects a hypothesis that has a high likelihood. Then, the above-described radar apparatus identifies the relative velocity of the selected hypothesis as the true relative velocity.

As a result of detailed examination by the present inventors, an issue has been found in that, when the above-described radar apparatus tracks the plurality of hypotheses using a time series of measurement results, if a plurality of objects that differ from each other are erroneously tracked as the same object, an erroneous hypothesis may be selected. Furthermore, an issue has been found in that, as a result of the erroneous hypothesis being selected, a folding (aliasing) ghost may be generated.

For example, the folding ghost may be generated as a result of a plurality of roadside objects that are arrayed in a continuous manner being erroneously tracked as the same object. As a result of the folding ghost being generated, an object that is actually a stationary object may be erroneously recognized to be a moving object. As a result of a stationary object being erroneously recognized to be a moving object, an unnecessary warning to a driver and/or unnecessary vehicle control may occur.

It is thus desired to provide a radar apparatus that is capable of determining a folding ghost.

One exemplary embodiment of the present disclosure provides a radar apparatus that is mounted to a vehicle and includes a transmitting unit and a receiving unit.

The transmitting unit is configured to transmit a transmission signal that is a pulse signal or a chirp signal, at a repetition cycle that is set.

The receiving unit is configured to receive a reflection signal that is generated by the transmission signal transmitted by the transmitting unit being reflected by at least one object.

The radar apparatus also includes a setting unit, a detecting unit, a measuring unit, a target object tracking unit, a residual calculating unit, an evaluating unit, and a ghost determining unit.

The setting unit is configured to set the repetition cycle that differs from the repetition cycle of a preceding processing cycle as the repetition cycle of a next processing cycle.

The detecting unit is configured to detect at least one target object signal that corresponds to at least one target object from the reflection signal received by the receiving unit.

The measuring unit is configured to calculate at least one target object measurement value from the at least one target object signal detected by the detecting unit. Each of the at least one target object measurement value includes, as an element, a velocity measurement value that takes into consideration velocity folding of the at least one target object.

The target object tracking unit includes a predicting unit and an estimating unit and is configured to track each of the at least one target object from a time series of the at least one target object measurement value calculated by the measuring unit.

The predicting unit is configured to calculate a target object prediction value that corresponds to a current state of each of the at least one target object from a target object estimation value that corresponds to a past state of each of the at least one target object.

The estimating unit is configured to associate the target object prediction value with the target object measurement value and calculate the target object estimation value that corresponds to the current state of each of the at least one target object, based on the target object prediction value and the target object measurement value that are associated with each other. The target object prediction value includes a velocity prediction value as an element.

The residual calculating unit is configured to calculate a velocity residual of each of the at least one target object. The velocity residual is a difference between the velocity prediction value and the velocity measurement value.

The evaluating unit is configured to calculate an evaluation value of each of the at least one target object based on a magnitude of variation in the velocity residual in time series of each of the at least one target object. The evaluation value corresponds to a probability of each of the at least one target object being a folding ghost.

The ghost determining unit is configured to determine whether each of the at least one target object is a folding ghost based on the evaluation value of each of the at least one target object.

According to the radar apparatus according to one exemplary embodiment of the present disclosure, the velocity residual that is the difference between the velocity prediction value and the velocity measurement value of each of the at least one target object is calculated. When each of the at least one target object is a folding ghost, the variation in the velocity residual in time series increases. Therefore, the evaluation value that corresponds to the probability of each of the at least one target object being a folding ghost is calculated based on the magnitude of the variation in the velocity residual in time series. Consequently, it can be determined whether each of the at least one target object is a folding ghost based on the calculated evaluation value.

Embodiments for implementing the present disclosure will hereinafter be described with reference to the drawings.

First Embodiment 1-1. Configuration

First, a configuration of a driving assistance system 100 according to a present embodiment will be described with reference to FIG. 1. The driving assistance system 100 includes a radar apparatus 10 and a driving assistance apparatus 50. The driving assistance system 100 is mounted to a vehicle 60.

Figure 2:
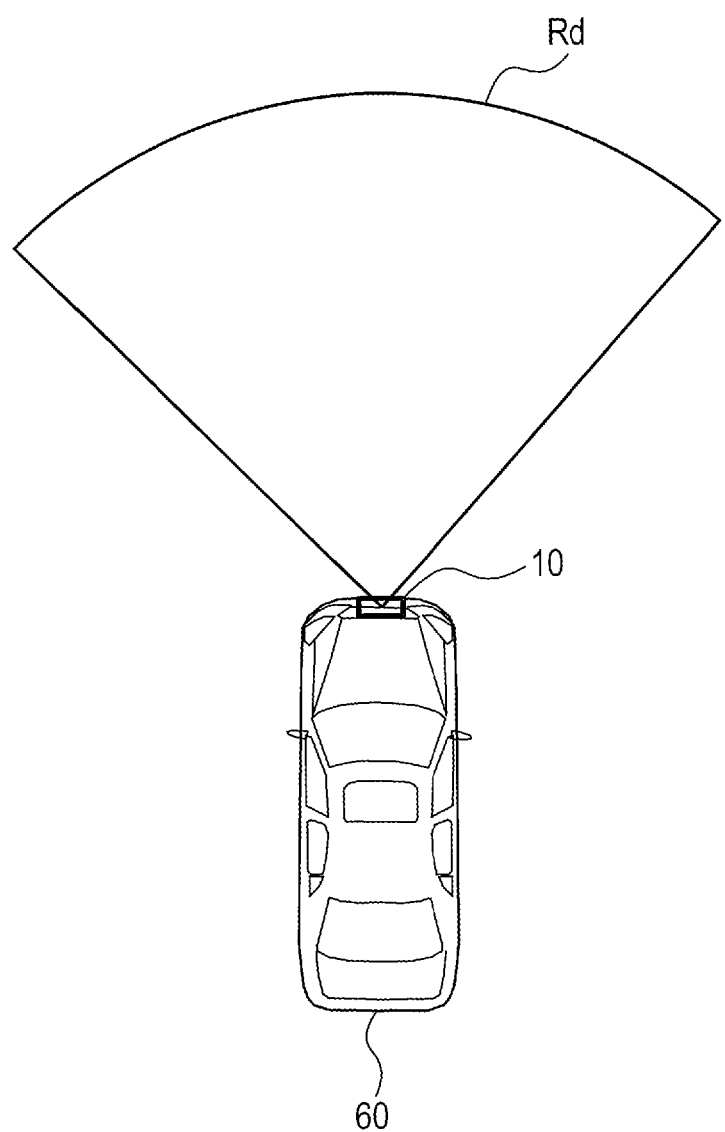
FIG. 2 is a diagram illustrating an example of a mounting position and a detection range of a radar according to the first embodiment.
Figure 3:
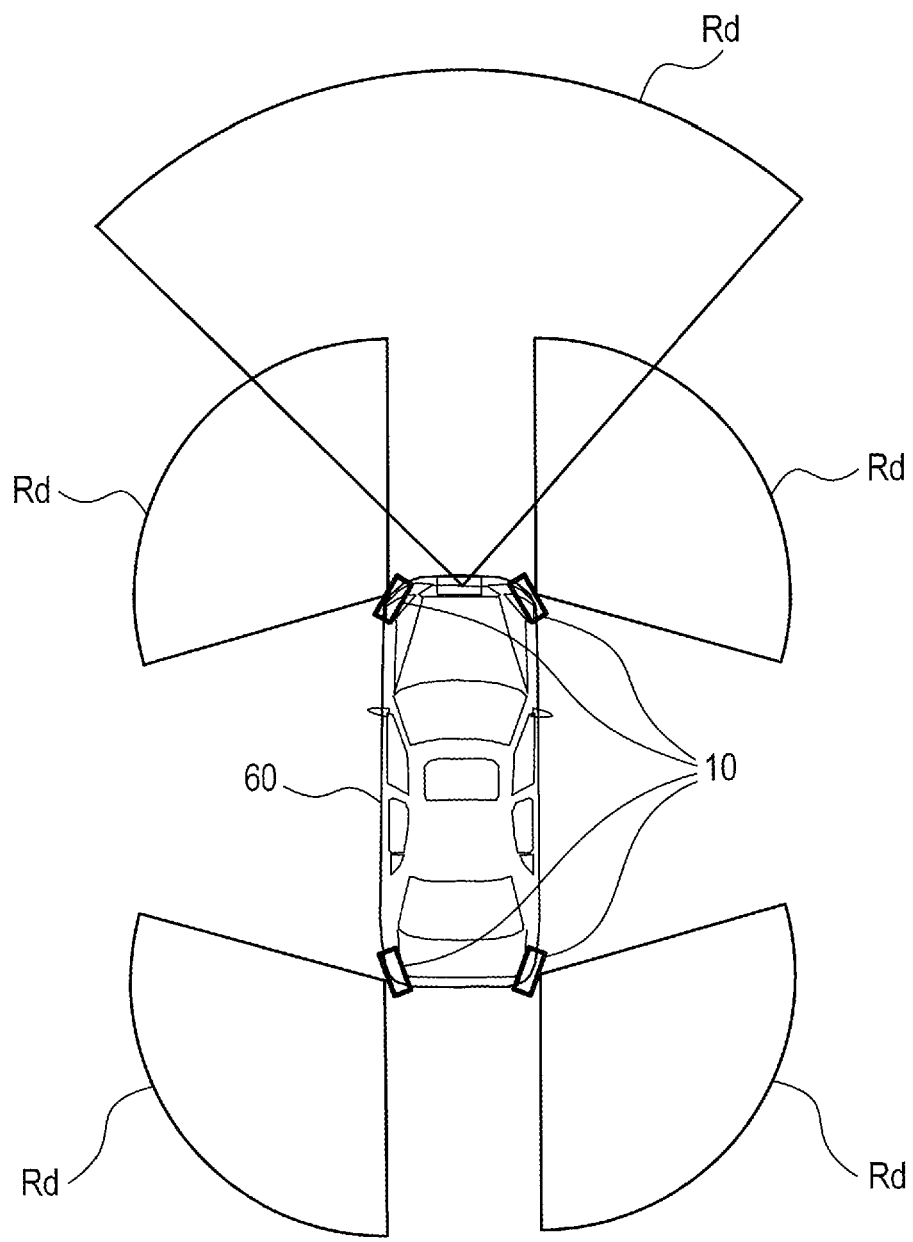
FIG. 3 is a diagram illustrating another example of the mounting position and the detection range of the radar according to the first embodiment.

As shown in FIG. 2, the radar apparatus 10 is mounted to a front center (such as a center of a front bumper) of the vehicle 60. The radar apparatus 10 has a detection range Rd that includes an area to the front and center of the vehicle 60. Alternatively, as shown in FIG. 3, the radar apparatus 10 may be mounted to each of the front center of the vehicle 60, a front left side and a front right side (such as on a left end and a right end of the front bumper) of the vehicle 60, and a rear left side and a rear right side (such as a left end and a right end of a rear bumper) of the vehicle 60. That is, the radar apparatus 10 may have the detection range Rd that includes areas to the front center, the front left, the front right, the rear left, and the rear right of the vehicle 60. Not all of the five radar apparatuses 10 need be mounted to the vehicle 60. Only one of the five radar apparatuses 10 may be mounted to the vehicle 60. Alternatively, two or more of the five radar apparatuses 10 may be mounted to the vehicle 60.

The radar apparatus 10 is a Fast Chirp Modulation (FCM)-system millimeter-wave radar that transmits and receives chirp signals. The radar apparatus 10 includes a processing apparatus 20, a transmission antenna 11, and a reception antenna 12. The processing apparatus 20 includes a central processing unit (CPU), a read-only memory (ROM), a random access memory (RAM), and a core processor. The core processor performs a fast Fourier transform (that is, FFT) process and the like. The core processor may be eliminated from the processing apparatus 20. The processing apparatus 20 implements functions of a setting unit, a detecting unit, a measuring unit, a predicting unit, an estimating unit, a residual calculating unit, an evaluating unit, a determining unit, a stationary object velocity calculating unit, a ground velocity calculating unit, and a vehicle control unit of the present disclosure by implementing a program that is stored in the ROM. A portion or all of the functions implemented by the processing apparatus 20 may be implemented by hardware. In addition, at least one function among the setting unit, the detecting unit, the measuring unit, the predicting unit, the estimating unit, the residual calculating unit, the evaluating unit, the determining unit, the stationary object velocity calculating unit, the ground velocity calculating unit, and the vehicle control unit may be eliminated from the functions implemented by the processing apparatus 20.

The transmission antenna 11 includes a transmission array antenna that is configured by a plurality of antenna elements. The transmission antenna 11 repeatedly transmits chirp signals at a repetition cycle that is set by the processing apparatus 20.

Figure 14:
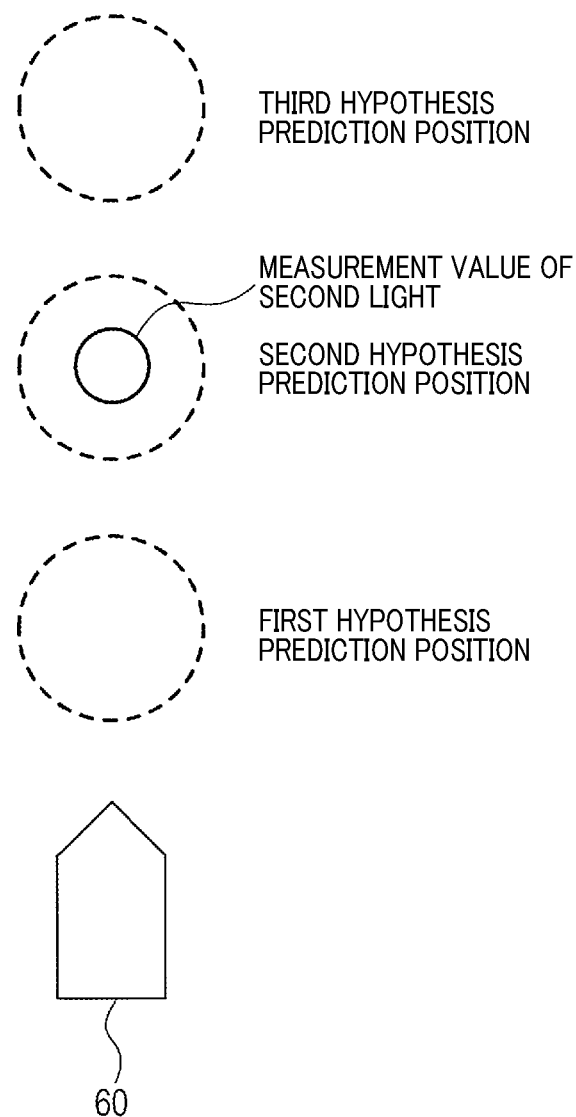
FIG. 14 is a diagram illustrating an measurement value of the second light and positions predicted from the hypotheses of the measurement value of the first light.

As shown in FIG. 14, the chirp signal is a radar signal that is frequency-modulated such that a frequency changes in a shape of a sawtooth wave. That is, the chirp signal has a frequency that continuously increases or decreases. The chirp signal shown in FIG. 4 has a frequency that continuously increases. However, the chirp signal may have a frequency that continuously decreases. The repetition cycle (referred to, hereafter, as a chirp cycle) of the chirp signal is a period from a start of transmission of one chirp signal to a start of transmission of a next chirp signal.

The transmission antenna 11 alternately transmits a chirp signal (referred to, hereafter, as a first chirp signal) of a first chirp cycle T1 and a chirp signal (referred to, hereafter, as a second chirp signal) of a second chirp cycle T2. The first chirp cycle T1 is a period that has a length T. The second chirp signal T2 is a period that is longer than the first chirp cycle T1 and has a length T+ΔT (ΔT>0). The transmission antenna 11 transmits M first chirp signals in a first processing cycle and transmits N second chirp signals in a second processing cycle. The transmission antenna 11 alternately repeats the first processing cycle and the second processing cycle, M and N are natural numbers.

The reception antenna 12 includes a reception array antenna that is configured by a plurality of antenna elements. The reception antenna 12 receives a reflection signal that is generated by the first chirp signal or the second chirp signal being reflected by a target object.

The processing apparatus 20 detects a target object signal that indicates the target object from the reflection signal received by the reception antenna 12. The processing apparatus 20 detects a velocity measurement value, a distance measurement value, and an orientation measurement value from the detected target object signal. The processing apparatus 20 establishes target object information by tracking the detected target object and generates a control command corresponding to the target object based on the established target object information. Then, the processing apparatus 20 outputs the generated control command to the driving assistance apparatus 50.

The driving assistance apparatus 50 assists traveling of the vehicle 60 based on the control command outputted from the processing apparatus 20. For example, the driving assistance apparatus 50 may output a warning to notify a driver of a likelihood of a collision and may perform brake operation to avoid a collision.

1-2. Processes

Next, a target object detection process performed by the processing apparatus 20 according to the first embodiment will be described with reference to a flowchart in FIG. 5. The processing apparatus 20 repeatedly performs the present process at a predetermined processing cycle.

First, at S10, the first chirp cycle T1 or the second chirp cycle T2 is set as the chirp cycle. When the first chirp cycle T1 is set as the chirp cycle in a previous processing cycle, the second chirp cycle T2 is set as the chirp cycle in a current processing cycle. When the second chirp cycle T2 is set as the chirp cycle in the previous processing cycle, the first chirp cycle T1 is set as the chirp cycle in the current processing cycle.

Next, at S20, when the first chirp cycle T1 is set at S10, the first chirp signal is transmitted from the transmission antenna 11 and the reflection signal received by the reception antenna 12 is acquired. In addition, when the second chirp cycle T2 is set at S10, the second chirp signal is transmitted from the transmission antenna 11 and the reflection signal received by the reception antenna 12 is acquired.

Figure 8:
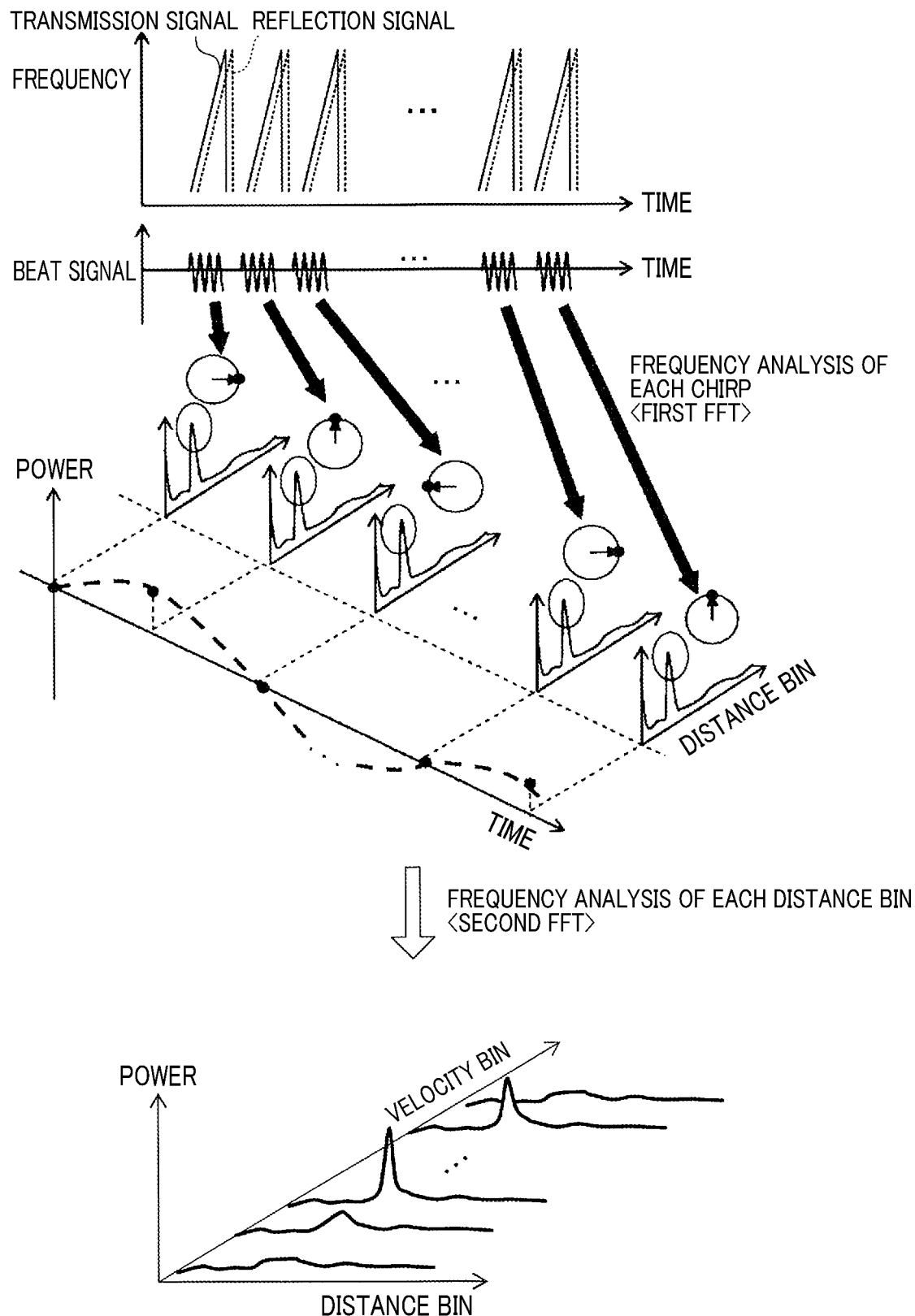
FIG. 8 is an explanatory diagram illustrating an overview of a two-dimensional FFT.

Next, at S30, at least one target object signal is detected from the reflection signal received at S20. Specifically, as shown in FIG. 8, a beat signal is acquired from a transmission signal and the reflection signal. When the first chirp signal is transmitted, M beat signals are acquired. In addition, when the second chirp signal is transmitted, N beat signals are acquired.

Then, as an initial FFT process, the FFT process is performed for each of the acquired M or N beat signals, and M or N distance spectrums are calculated. The distance spectrum corresponds to a two-dimensional spectrum that indicates power relative to distance. The beat signal has a frequency component that corresponds to a distance to the object. Therefore, a frequency bin of the calculated distance spectrum corresponds to a distance bin.

Furthermore, as a second FFT process, the FFT process is performed for each distance bin of the calculated M or N distance spectrums, and a distance velocity spectrum is calculated. The distance velocity spectrum corresponds to a three-dimensional spectrum that indicates power relative to distance and velocity. Then, a peak in the distance velocity spectrum is extracted as the target object signal. The target object signal indicates presence of a target object. When a plurality of peaks are present, a plurality of target object signals are extracted.

Next, at S40, a target object measurement value is calculated from a velocity bin and the distance bin of the target object signal extracted at S30. The target object measurement value includes, as elements, a velocity measurement value, a distance measurement value, and an orientation measurement value of the target object. At least one of the velocity measurement value, the distance measurement value, and the orientation measurement value may be eliminated from the target object measurement value. The velocity measurement value corresponds to an measurement value of a relative velocity of the target object relative to the vehicle 60. The velocity measurement value is calculated from a detection velocity Vo that is detected from the velocity bin, a selected number of times of folding m1 or m2, and a maximum detection velocity Vmax, as described hereafter. The distance measurement value corresponds to an measurement value of a distance from the vehicle 60 to the target object. The orientation measurement value of the target object is calculated from an orientation spectrum that includes orientation information of the target object relative to the vehicle 60. The orientation spectrum is calculated by an arrival direction estimation algorithm being applied to the target object signal.

Here, a maximum detection velocity Vmax1 of the first chirp signal is expressed by a following expression (1). A maximum detection velocity Vmax2 of the second chirp signal is expressed by a following expression (2). The maximum detection velocity Vmax1 is a maximum value of the velocity measurement value that can be detected without folding when the first chirp signal is transmitted. The maximum detection velocity Vmax2 is a maximum value of the velocity measurement value that can be detected without folding when the second chirp signal is transmitted. c is velocity of light. fc is a center frequency of the first chirp signal and the second chirp signal. As shown in expressions (1) and (2), as a result of the first chirp cycle T1 being shorter than the second chirp cycle T2, the maximum detection velocity Vmax1 is greater than the maximum detection velocity Vmax2.

$$Vmax1 = c/(4 \times fc \times T1) \quad (1)$$

$$Vmax2 = c/(4 \times fc \times T2) \quad (2)$$

Figure 9:
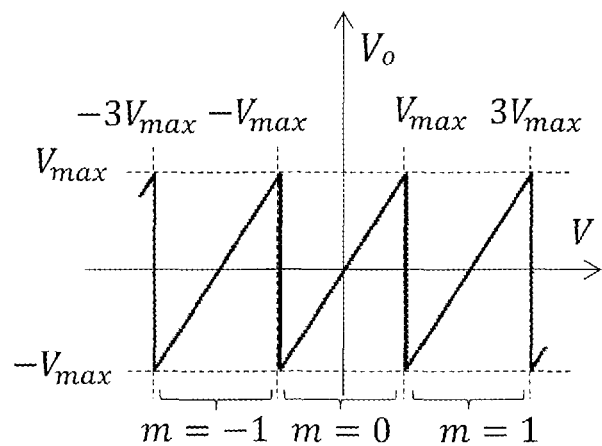
FIG. 9 is a diagram for explaining velocity folding.

As shown in FIG. 9, when the velocity measurement value exceeds the maximum detection velocity Vmax1 or the maximum detection velocity Vmax2, velocity folding occurs. Relationships in expressions (3) and (4) are established among the velocity measurement value, the maximum detection velocity, and a true velocity value. Vo1 is the detection velocity when the first chirp signal is transmitted. Vo2 is the detection velocity when the second chirp signal is transmitted. V is the true velocity value. m1 and m2 are the number of times of folding and are integers.

$$Vo1 = V - 2Vmax1 \times m1 \quad (3)$$

$$Vo2 = V - 2Vmax2 \times m2 \quad (4)$$

Figure 10:
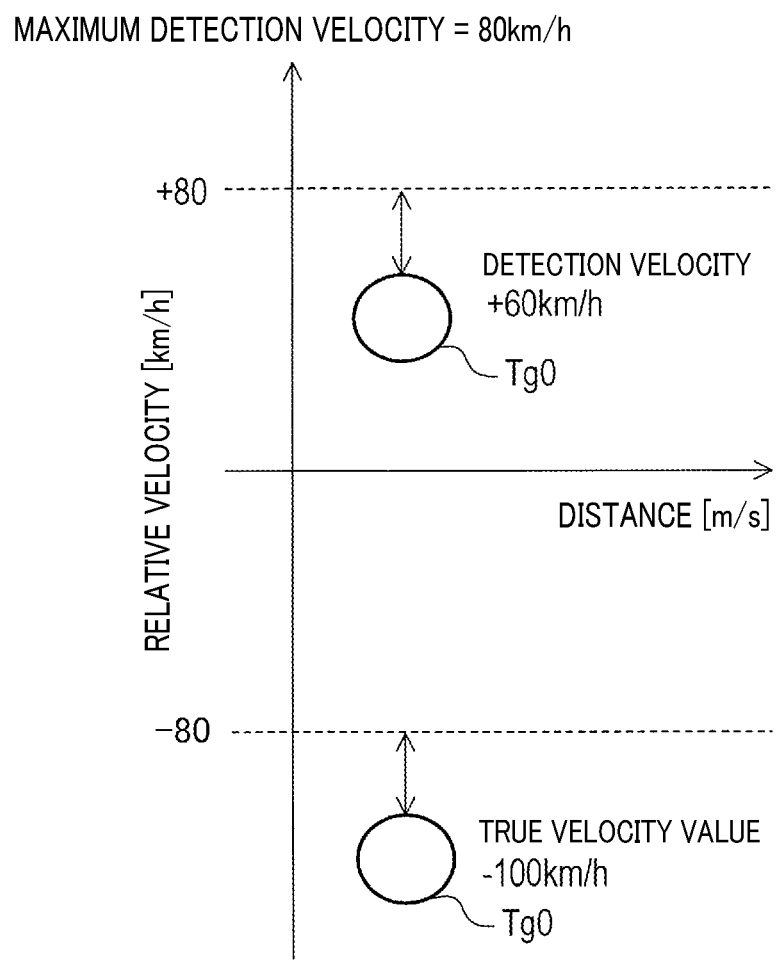
FIG. 10 is a diagram illustrating a detection velocity when a true velocity value is −100 km/h and a maximum detection velocity is 80 km/h.
Figure 11:
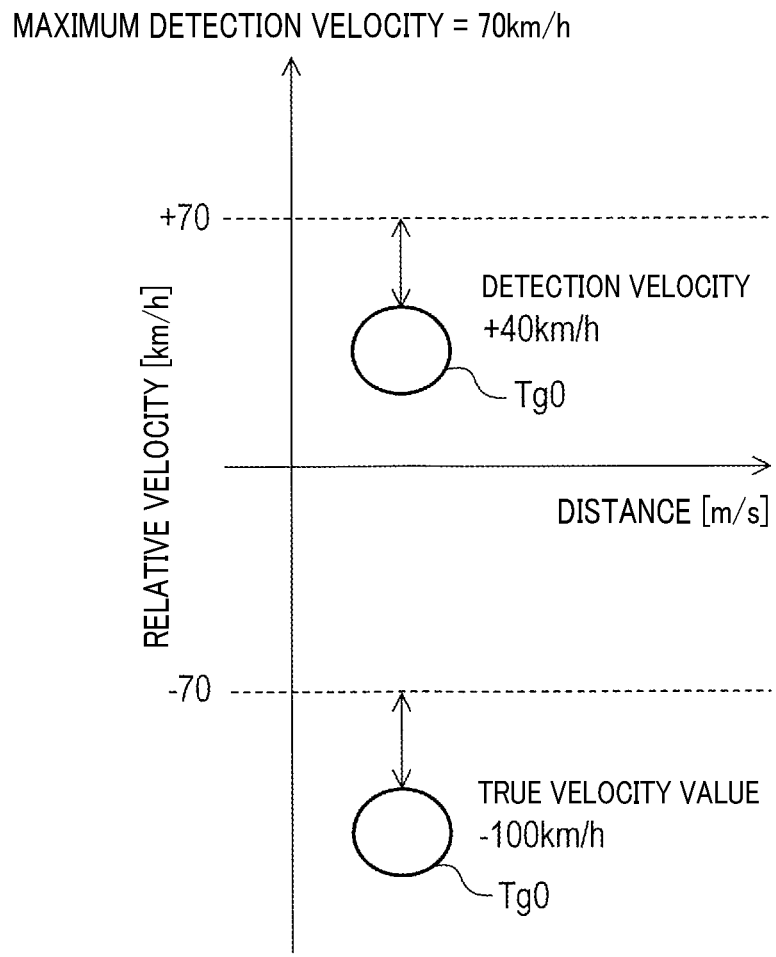
FIG. 11 is a diagram illustrating the detection velocity when the true velocity value is −100 km/h and the maximum detection velocity is 70 km/h.

For example, as shown in FIG. 10, when the maximum detection velocity Vmax1 is 80 km/h and the true velocity value of a target object Tg0 is −100 km/h, folding may occur −1 time, and +60 km/h may be detected as the detection velocity Vo of the target object Tg0. In addition, as shown in FIG. 11, when the maximum detection velocity Vmax2 is 70 km/h and the true velocity value of the target object Tg0 is −100 km/h, folding may occur −1 time, and +40 km/h may be detected as the detection velocity Vo of the target object Tg0.

Next, at S50, it is determined whether unprocessed target object information is present. Specifically, it is determined whether a target object for which processes at subsequent S60 to S170 are yet not performed is present among target objects that are being tracked and are present in the current processing cycle. When determined that an unprocessed target object is present at S50, the processing apparatus 20 selects a target object among the unprocessed target objects and proceeds to the process at S60. The processing apparatus 20 performs the processes at S60 to S170 for the selected target object. Meanwhile, when determined that no unprocessed target object is present, the processing apparatus 20 ends the present processing cycle.

At S60, a target object prediction value is calculated from information on the target object in a past processing cycle. The target object prediction value is calculated from the target object estimation value that is calculated in the past processing cycle. The target object prediction value includes, as elements, a velocity prediction value, a distance prediction value, and an orientation prediction value. Alternatively, the target object prediction value includes, as elements, the velocity prediction value, an X-coordinate prediction value, and a Y-coordinate prediction value. The target object estimation value includes, as elements, a velocity estimation value, a distance estimation value, and an orientation estimation value. Alternatively, the target object estimation value includes, as elements, the velocity estimation value, an X-coordinate estimation value, and a Y-coordinate estimation value. An X axis and a Y axis are axes that are orthogonal to each other on a road surface.

Next, at S70, the target object estimation value in the current processing cycle is calculated. First, the target object prediction value calculated at S60 is associated with a target object measurement value that has a high likelihood of being the same target object among the target object measurement values calculated at S40. Specifically, when a difference between each element of the target object prediction value and each element of the target object measurement value in the current processing cycle is within an association range, the target object prediction value is associated with the target object measurement value. The association range is set for each element of the target object prediction value and the target object measurement value. Then, a filter process is performed on the target object prediction value and the target object measurement value that is associated with the target object prediction value, and the target object estimation value in the current processing cycle is calculated. For example, the filter process may use a filter such as a Kalman filter.

Next, at S80, a ground velocity of the target object is calculated. Specifically, the ground velocity of the target object is calculated using the velocity measurement value and the orientation measurement value of the target object calculated at S40, and a vehicle velocity of the vehicle 60.

Next, at S90, it is determined whether the ground velocity calculated at S80 is equal to or greater than a velocity threshold. The velocity threshold is a threshold for determining whether a target object is to be subjected to ghost determination. In the ghost determination, it is determined whether the target object is a folding ghost or an actual object. The folding ghost is generated when target objects that differ from each other are erroneously tracked as the same target object. That is, the folding ghost is generated as a result of the prediction value and the measurement value of target objects that differ from each other being associated.

As described above, folding may occur in the detection velocity Vo. Therefore, when a target object is initially detected, a plurality of hypotheses regarding the velocity measurement value are generated taking into consideration folding of the velocity. For example, in expressions (3) and (4), three hypotheses in which the number of times of folding are assumed to be −2, −1, and 0 are generated. Each of the generated hypotheses is tracked, and the most probable hypothesis, that is, the number of times of folding is selected. In this manner, during tracking of each hypothesis, one hypothesis may become a value that is close to the measurement value of another target object. As a result, the one hypothesis is associated with the measurement value of the other target object, and a folding ghost may be generated.

Figure 12:
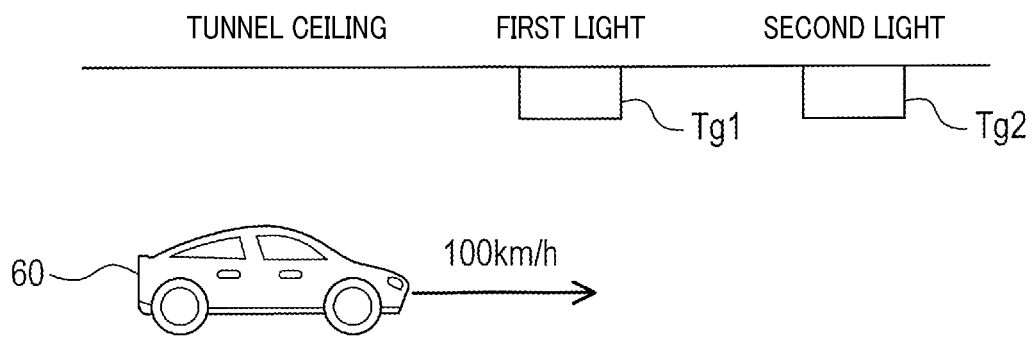
FIG. 12 is a diagram illustrating a vehicle traveling through a tunnel in which a first light and a second light are set.

As a result of such a folding ghost being generated, a target object that is actually a stationary object may be erroneously recognized as a moving object. FIG. 12 shows an example of a scene in which the vehicle 60 is traveling through a tunnel. On a ceiling of the tunnel, a first light Tg1 and a second light Tg2 are set at a predetermined interval. The velocity of the vehicle is 100 km/h and the maximum detection velocity Vmax is 80 km/h.

First, the first light Tg1 enters the detection range Rd of the radar apparatus 10 and the first light Tg1 is observed. At this time, as shown in FIG. 13, a first hypothesis, a second hypothesis, and a third hypothesis are generated. The first hypothesis assumes that the number of times of folding is 0. The second hypothesis assumes that the number of times of folding is −1. The third hypothesis assumes that the number of times of folding is −2. The velocity measurement value of the first light Tg1 in the first hypothesis is −100 km/h. In addition, the velocity measurement value of the first light Tg1 in the second hypothesis is +60 km/h. Furthermore, the velocity measurement value of the first light Tg1 in the third hypothesis is +220 km/h. In this case, in actuality, the first hypothesis is correct.

Subsequently, the first light Tg1 leaves the detection range Rd and the second light Tg2 enters the detection range Rd. The second light Tg2 is observed. As shown in FIG. 14, from the first hypothesis, the second hypothesis, and the third hypothesis of the first light Tg1, a prediction position of the first hypothesis, a prediction position of the second hypothesis, and a prediction position of the third hypothesis are calculated. In addition, the prediction position of the second hypothesis and an measurement value of the second light Tg2 may be values that are close. In this case, the prediction position of the second hypothesis and the measurement value of the second light Tg2 are associated. Then, the second hypothesis is determined to be most probable. The second hypothesis is selected as a true target object and the first hypothesis and the third hypothesis are eliminated. That is, −1 is selected as the number of times of folding.

As a result, the first light Tg1 and the second light Tg2 are recognized as a moving object that is moving at a relative velocity of 60 km/h relative to the vehicle 60. That is, a target object that is actually a stationary object is erroneously recognized to be a moving object. The target object that is erroneously recognized in this manner corresponds to the folding ghost. When the folding ghost is generated, erroneous vehicle control such as an unnecessary warning to the driver and unnecessary brake control may be performed.

Therefore, in the processes at S100 and subsequent thereto, it is determined whether the target object is a folding ghost. Here, when a target object that is a moving object is erroneously recognized to be a stationary object, erroneous vehicle control is not performed. Therefore, likelihood of the erroneous recognition becoming a problem is low, even when the erroneous recognition is not taken into consideration. Therefore, ghost determination is performed only when a target object that is a stationary object is likely to be erroneously recognized as a moving object. That is, ghost determination is performed only when the target object is a moving object or a moving object ghost. The velocity threshold at S90 is set to a value that enables differentiation between a stationary object and a moving object, taking into consideration velocity error in the vehicle 60. For example, when the velocity of the vehicle 60 is 100 km/h and the velocity error is 10%, the velocity threshold may be set to 10 km/h. Then, when determined that the ground velocity is be equal to or greater than the velocity threshold at S90, the processing apparatus 20 proceeds to the process at S100. When determined that the ground velocity is less than the velocity threshold, the processing apparatus 20 returns to the process at S50.

At S100, it is determined whether ghost determination is completed regarding the target object selected at S50. When determined that ghost determination is completed at S100, the processing apparatus 20 returns to the process at S50. When determined that ghost determination is not completed, the processing apparatus 20 proceeds to the process at S105.

Figure 6:
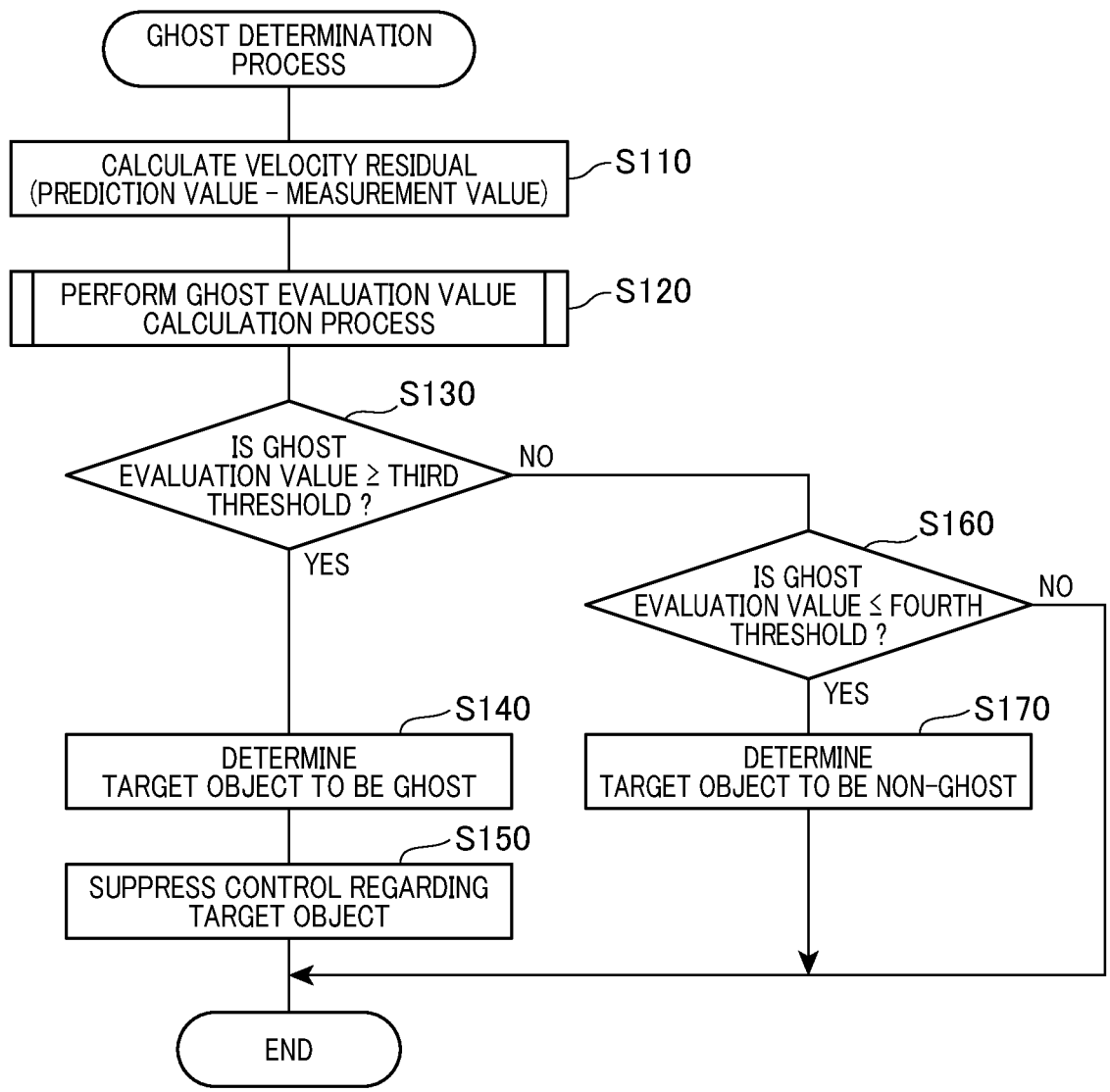
FIG. 6 is a subroutine illustrating a ghost determination process according to the first embodiment.

At S105, a ghost determination process is performed. Specifically, a subroutine shown in FIG. 6 is performed. First, at S110, a velocity residual is calculated. The velocity residual is a difference between the velocity prediction value calculated at S60 and the velocity measurement value that is associated with the velocity prediction value.

Next, at S120, a ghost evaluation value is calculated based on a magnitude of variation in the velocity residual in time series. The ghost evaluation value indicates a probability of the target object being a folding ghost.

As shown in FIG. 9 and FIG. 10, the detection velocities Vo1 and Vo2 relative to the true velocity value V change depending on the maximum detection velocities Vmax1 and Vmax2. When the correct hypothesis, that is, the correct number of times of folding m1 and m2 are selected, even when the maximum detection velocities Vmax1 and Vmax2 differ, the velocity measurement values that are calculated based on the detection velocities Vo1 and Vo2 detected from the same target object are substantially equal. Meanwhile, when an erroneous hypothesis, that is, erroneous number of times of folding m1 and m2 are selected, when the maximum detection velocities Vmax1 and Vmax2 differ, the velocity measurement values that are calculated based on the detection velocities Vo1 and Vo2 detected from the same target object differ.

Therefore, in a case in which the first chirp signal and the second chirp signal are alternately transmitted, when the correct hypothesis is selected, the difference between the velocity prediction value and the velocity measurement value is relatively small. Meanwhile, when an erroneous hypothesis is selected, the difference between the velocity prediction value and the velocity measurement value is relatively large.

However, even when the correct hypothesis is selected, in cases in which the target object accelerates, decelerates, or the like, the difference between the velocity prediction value and the velocity measurement value is relatively large.

However, when an erroneous hypothesis is selected, variation in the difference between the velocity prediction value and the velocity measurement value in time series is also relatively large. In contrast, when the correct hypothesis is selected, even in cases in which the target object accelerates, decelerates, or the like, variation in the difference between the velocity prediction value and the velocity measurement value in time series is relatively small. Therefore, the ghost evaluation value is calculated based on the magnitude of the variation in the velocity residual in time series.

Figure 7:
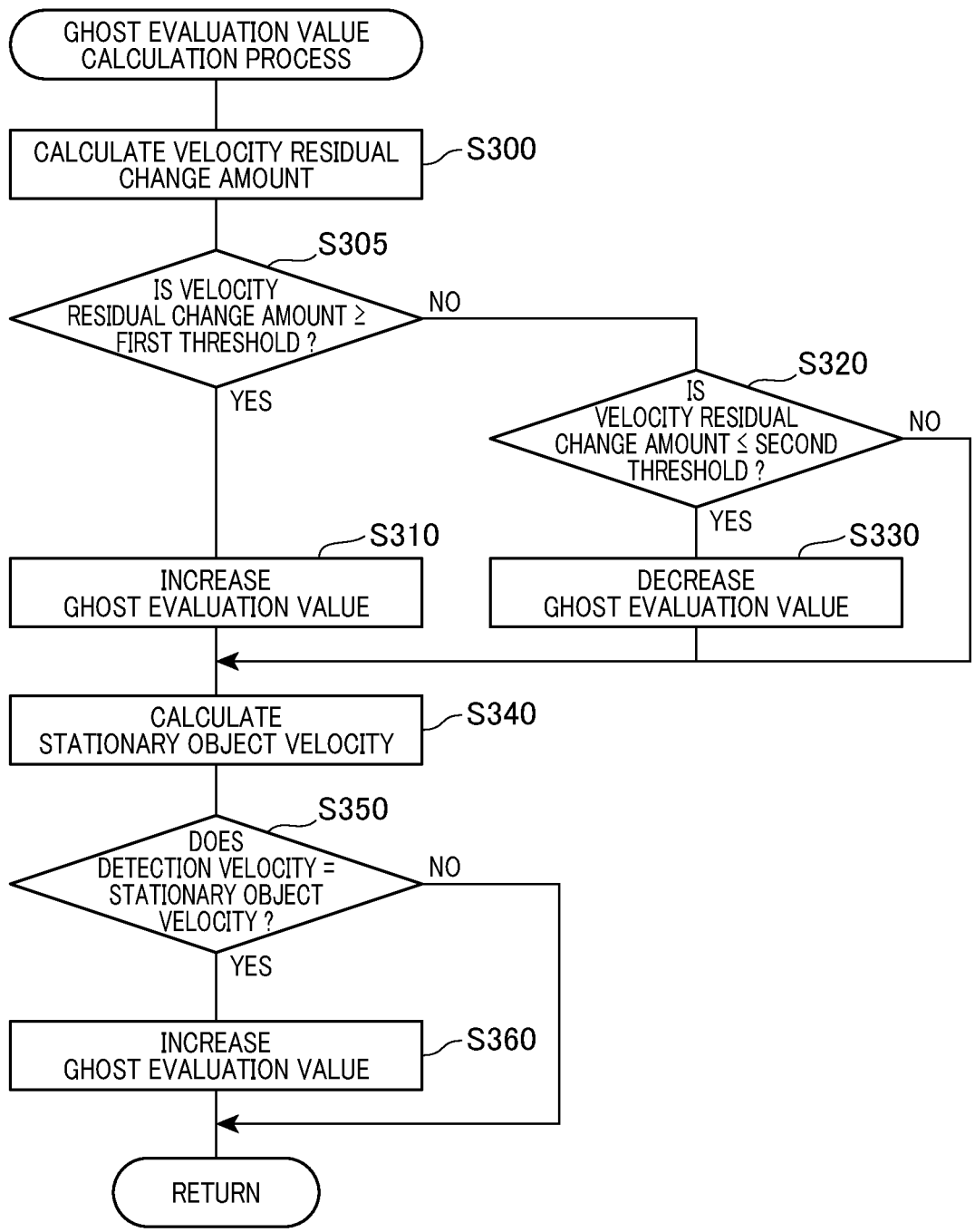
FIG. 7 is a subroutine illustrating a ghost evaluation value calculation process according to the first embodiment.

Specifically, a subroutine shown in FIG. 7 is performed. First, at S300, a velocity residual change amount is calculated as the magnitude of the variation in the velocity residual in time series. The velocity residual change amount corresponds to an absolute value of a difference between the velocity residual calculated in the current processing cycle and the velocity residual calculated in the previous processing cycle.

Next, at S305, it is determined whether the velocity residual change amount calculated at S300 is equal to or greater than a first threshold. When determined that the velocity residual change amount is equal to or greater than the first threshold at S305, the processing apparatus 20 proceeds to a process at S310. When determined that the velocity residual change amount is less than the first threshold, the processing apparatus 20 proceeds to a process at S320.

At S310, the ghost evaluation value is increased because the likelihood of the target object being a folding ghost is relatively high. For example, 1 may be added to the ghost evaluation value. Subsequently, the processing apparatus 20 proceeds to a process at S340.

Meanwhile, at S320, it is determined whether the velocity residual change amount is equal to or less than a second threshold that is set. The second threshold is less than the first threshold. When determined that the velocity residual change amount is equal to or less than the second threshold at S320, the processing apparatus 20 proceeds to a process at S330.

At S330, because the likelihood of the target object being a folding ghost is relatively low, the ghost evaluation value is decreased. For example, 1 may be subtracted from the ghost evaluation value. Subsequently, the processing apparatus 20 proceeds to the process at S340.

Meanwhile, at S320, when the velocity residual change amount is determined to be greater than the second threshold, the likelihood of the target object being a folding ghost is neither relatively high nor relatively low. Therefore, in this case, the processing apparatus 20 proceeds to the process at S340 without changing the ghost evaluation value.

Next, at S340, a stationary object velocity is calculated. The stationary object velocity is a detection velocity of the target object when the target object is assumed to be a stationary object. Specifically, the stationary object velocity is calculated from the velocity of the vehicle 60 and the orientation measurement value. The stationary object velocity corresponds to a value in which a projection velocity of the vehicle 60 in the orientation direction of the target object is set to a negative value.

Next, at S350, it is determined whether the detection velocity Vo (that is, the velocity before folding is assumed) coincides with the stationary object velocity calculated at S340. That is, it is determined whether the target object is a stationary object. Specifically, it is determined whether a difference between the detection velocity Vo and the stationary object velocity is equal to or less than a predetermined value. The predetermined value is a value that is sufficiently small enough that the detection velocity Vo can be considered to coincide with the stationary object velocity. When determined that the detection velocity Vo coincides with the stationary object velocity at S350, the processing apparatus 20 proceeds to a process at S360. Meanwhile, at S350, when determined that the detection velocity Vo does not coincide with the stationary object velocity, the processing apparatus 20 ends the present subroutine and proceeds to the process at S130.

At S360, the ghost evaluation value is increased. Frequency of the generation of the folding ghost as a result of erroneous tracking of a stationary object is relatively high. Therefore, when the target object is determined to be a stationary object, the ghost evaluation value is increased. Subsequently, the processing apparatus 20 ends the present subroutine and proceeds to the process at S130.

Returning to FIG. 6, at S130, it is determined whether the ghost evaluation value is equal to or greater than a third threshold that is set. When determined that the ghost evaluation value is equal to or greater than the third threshold at S130, the processing apparatus 20 proceeds to the process at S140. When determined that the ghost evaluation value is less than the third threshold, the processing apparatus 20 proceeds to the process at S150.

At S140, the target object is determined to be a folding ghost.

Next, at S150, vehicle control regarding the target object that is determined to be a folding ghost at S140 is suppressed. That is, output of control commands to the driving assistance apparatus 50 based on this target object is suppressed. Subsequently, the processing apparatus 20 returns to the process at S50. Here, regarding the target object that is determined to be a folding ghost, ghost determination is completed in the current processing cycle. The target object is not subjected to ghost determination in subsequent processing cycles. That is, at S100 in the subsequent processing cycles, ghost determination is determined to be completed for this target object.

Meanwhile, at S160, it is determined whether the ghost evaluation value is equal to or less than a fourth threshold that is set. The fourth threshold is less than the third threshold. When determined that the ghost evaluation value is equal to or less than the fourth threshold at S160, the processing apparatus 20 proceeds to the process at S170.

At S170, the target object is determined to be a non-folding-ghost (non-ghost), that is, an actual object. Subsequently, the processing apparatus 20 returns to the process at S50. Here, regarding the target object that is determined to be a non-folding-ghost, ghost determination is completed in the current processing cycle. The target object is not subjected to ghost determination in the subsequent processing cycles.

In addition, when determined that the ghost evaluation value is greater than the fourth threshold at S160, the processing apparatus 20 returns to the process at S50 without determining whether the target object is a ghost or an actual object. Because ghost determination is not completed in the current processing cycle for this target object, the target object is to be subjected to ghost determination in the subsequent processing cycles. That is, at S100 in the subsequent processing cycles, the target object is determined to be that for which ghost determination is not yet completed.

1-3. Effects

According to the first embodiment described above, following effects can be achieved.

(1) The velocity residual is calculated, and the ghost evaluation value is calculated based on the magnitude of the variation in the velocity residual in time series. Consequently, whether the target object is a folding ghost can be determined based on the calculated ghost evaluation value.

(2) Whether the target object is a folding ghost can be instantaneously determined through use of the velocity residual change amount.

(3) When the velocity residual change amount is equal to or greater than the first threshold, the likelihood of the target object being determined to be a folding ghost can be increased by the ghost evaluation value being increased.

(4) When the velocity residual change amount is equal to or less than the second threshold, the likelihood of the target object being determined to be a folding ghost can be decreased by the ghost evaluation value being decreased.

(5) When the ghost evaluation value is equal to or greater than the third threshold, the target object can be determined to be a folding ghost because the likelihood of the target object being a folding ghost is sufficiently high.

(6) When the ghost evaluation value is equal to or less than the fourth threshold, the target object can be determined to be an actual object because the likelihood of the target object being a folding ghost is sufficiently low.

(7) The frequency of the generation of the folding ghost as a result of erroneous tracking of a stationary object is relatively high. When the measurement velocity of the target object coincides with the stationary object velocity, as a result of the evaluation value being increased, the folding ghost resulting from a stationary object being erroneously tracked can be favorably detected. Moreover, the stationary object can be suppressed from being erroneously recognized as a moving object.

(8) When the stationary object is erroneously recognized as a moving object, an issue occurs in vehicle control regarding the target object. Therefore, when the ground velocity of the target object is equal to or greater than the velocity threshold, the target object is to be subjected to determination regarding the folding ghost. As a result, the folding ghost determination is performed only when an issue occurs in vehicle control. Consequently, unnecessary folding ghost determination can be suppressed and load can be reduced.

(9) Output of control commands based on a target object that is determined to be a folding ghost is suppressed, and thus unnecessary warnings to the driver and/or unnecessary control of the vehicle can be suppressed.

Second Embodiment 2-1. Differences from the First Embodiment

A basic configuration according to a second embodiment is similar to that according to the first embodiment. Therefore, descriptions of shared configurations are omitted. Differences are mainly described. Here, reference numbers that are the same as those according to the first embodiment indicate identical configurations. Earlier descriptions are referenced.

The second embodiment differs from the above-described first embodiment regarding the ghost evaluation value calculation process. According to the first embodiment, the ghost evaluation value is increased or decreased based on the velocity residual change amount. In contrast, the second embodiment differs from the first embodiment in that, according to the second embodiment, dispersion of velocity residuals in time series is calculated as the ghost evaluation value.

2-2. Processes

Figure 15:
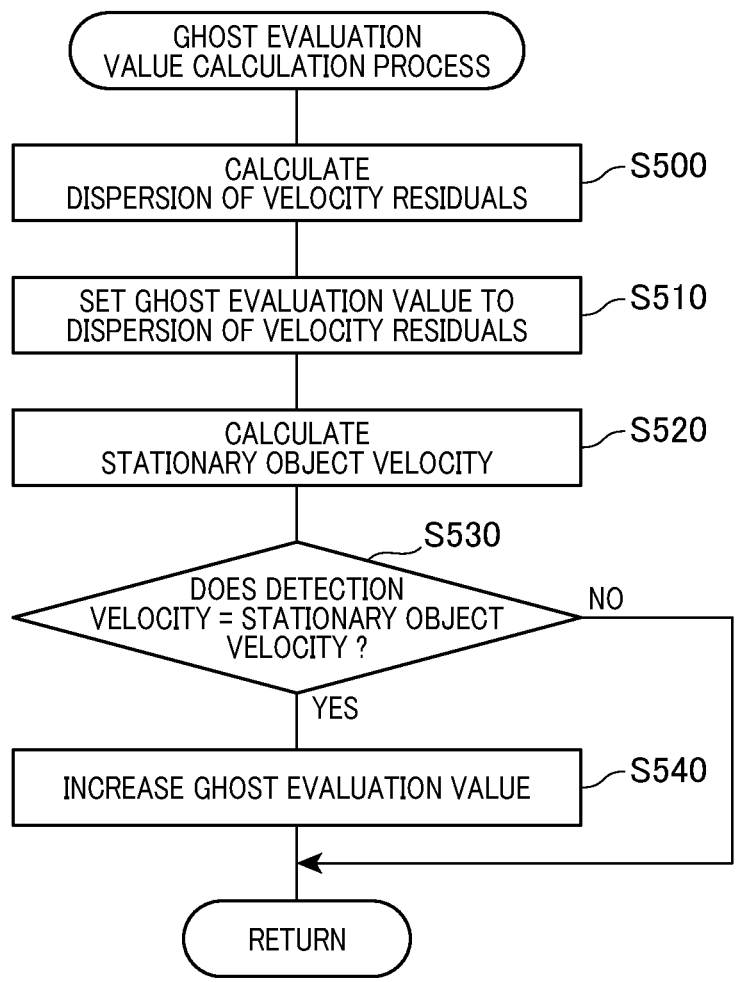
FIG. 15 is a subroutine illustrating a ghost evaluation value calculation process according to the second embodiment.

Next, the ghost evaluation value calculation process performed by the processing apparatus 20 according to the second embodiment will be described with reference to a subroutine in FIG. 15. The processing apparatus 20 according to the present embodiment performs the subroutine shown in FIG. 15 instead of the subroutine shown in FIG. 7 in the ghost evaluation value calculation process at S120.

First, at S500, a dispersion value of the velocity residuals that are calculated in K processing cycles prior to the current processing cycle is calculated. K is an integer of 2 or more.

Next, the velocity residual calculated at S500 is set as the ghost evaluation value. Next, at S520 to S540, processes similar to those at S340 to S360 are performed.

2-3. Effects

According to the second embodiment described above, following effects can be achieved in addition to the effects (1) and (3) to (9) described above.

As a result of the dispersion of the velocity residuals in time series being used, whether the target object is a folding ghost can be determined based on statistical variations in the velocity residual.

Third Embodiment 3-1. Differences from the First Embodiment and the Second Embodiment A basic configuration according to a third embodiment is similar to those according to the first embodiment and the second embodiment. Therefore, descriptions of shared configurations are omitted. Differences are mainly described. Here, reference numbers that are the same as those according to the first embodiment and the second embodiment indicate identical configurations. Earlier descriptions are referenced.

The third embodiment differs from the first embodiment or the second embodiment in that the same object determination process and a ghost erroneous determination suppression process are further performed in the target detection process according to the first embodiment or the second embodiment.

3-2. Processes

Next, the target object detection process performed by the processing apparatus 20 according to the third embodiment will be described with reference to a flowchart in FIG. 16.

Figure 5:
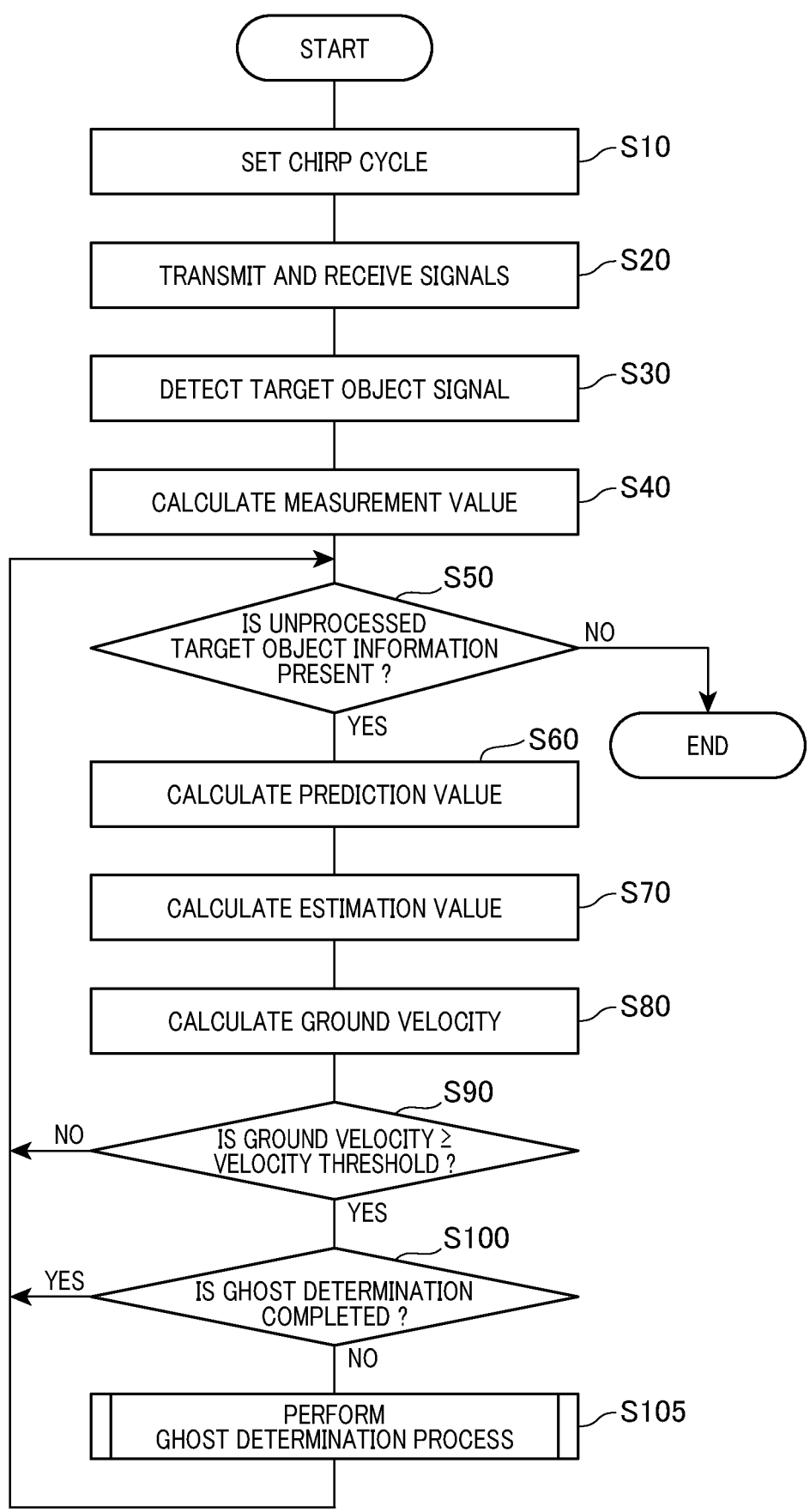
FIG. 5 is a flowchart illustrating a target object detection process according to the first embodiment.

First, at S610 to S705, processes similar to those at S10 to S105 in the flowchart shown in FIG. 5 are performed. Here, in the ghost evaluation value calculation process at S120 included in the ghost determination process at S105, the subroutine shown in FIG. 11 may be performed. Alternatively, the subroutine shown in FIG. 15 may be performed.

Figure 17:
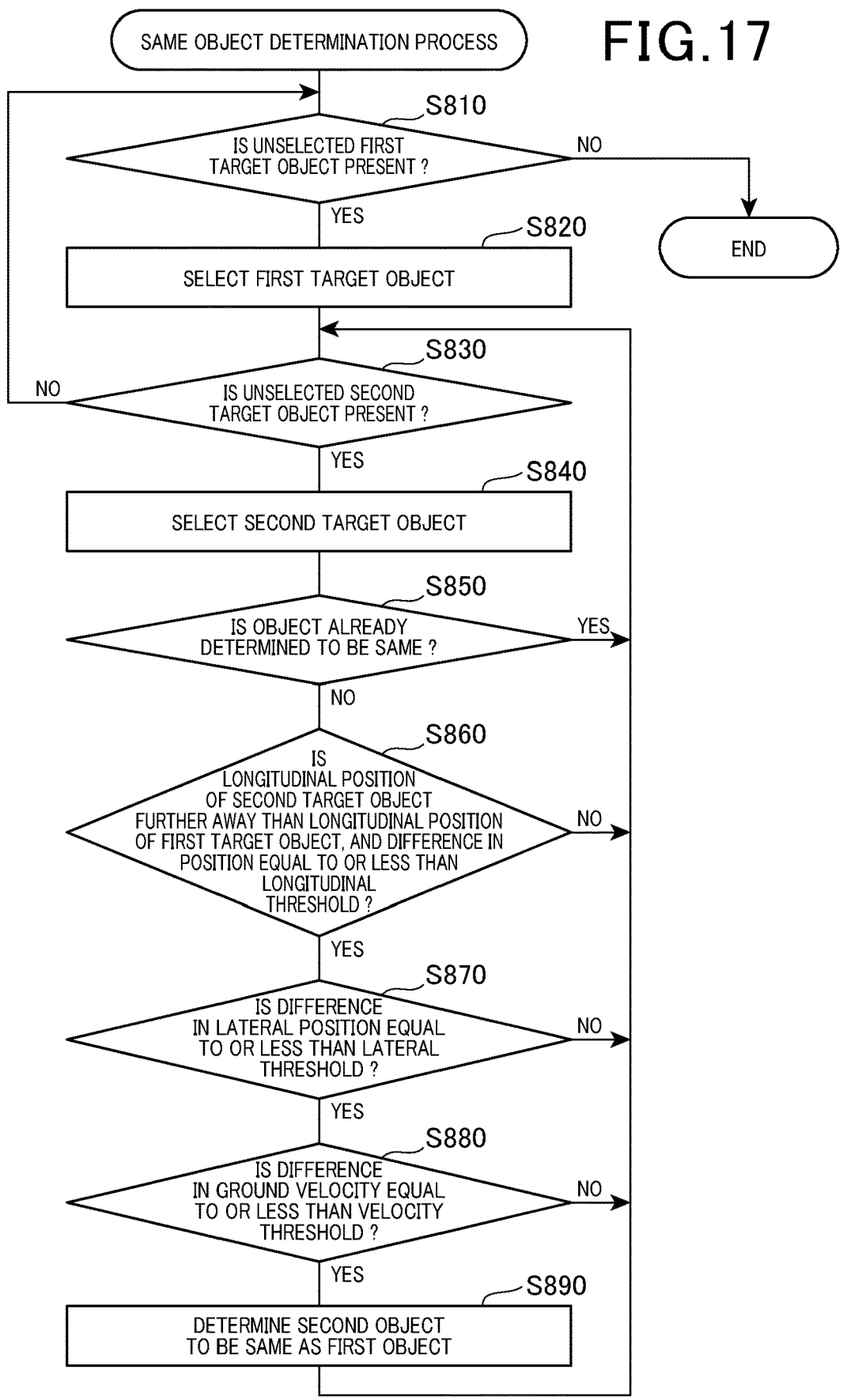
FIG. 17 is a subroutine illustrating the same object determination process according to the third embodiment.

Next, when determined that no unprocessed target object is present at S650, the processing apparatus 20 proceeds to a process at S800 and performs the same object determination process. Specifically, a subroutine shown in FIG. 17 is performed.

Figure 20:
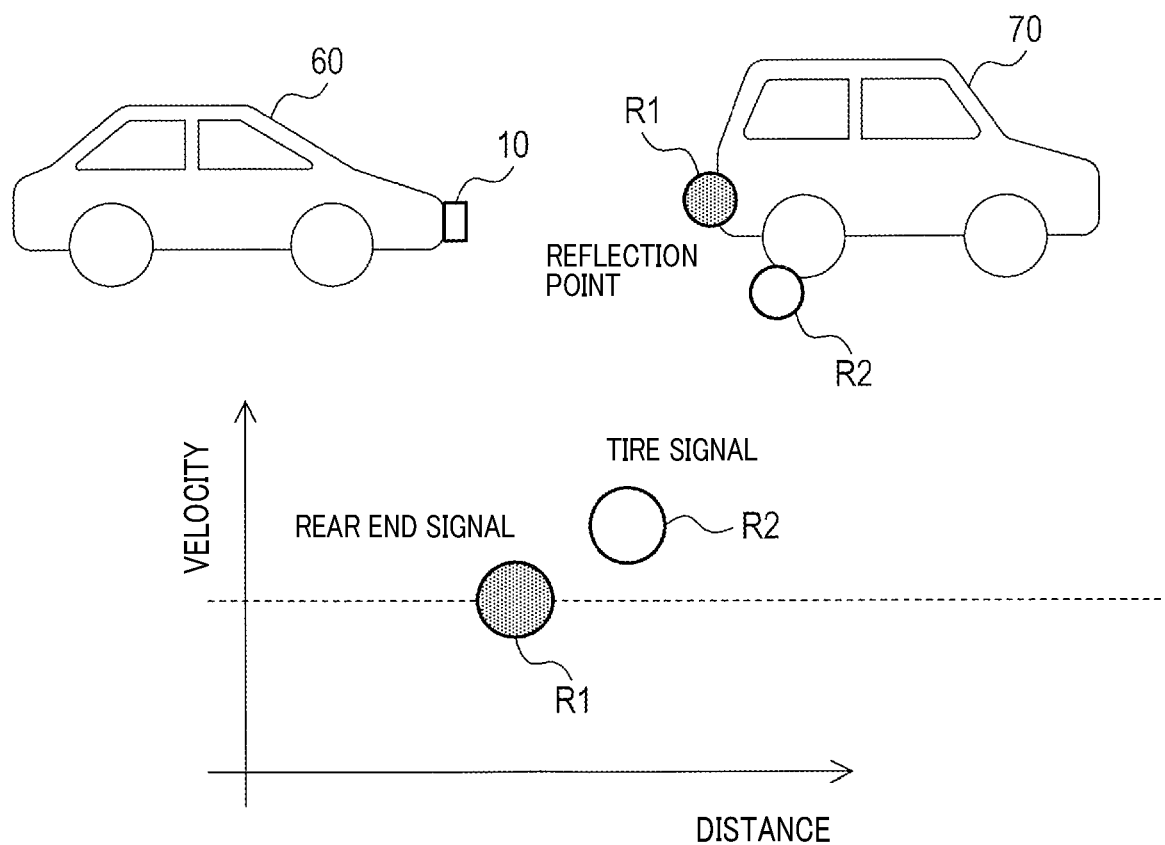
FIG. 20 is a diagram illustrating a rear end signal generated from a rear end of a preceding vehicle and a tire signal generated from a tire of the preceding vehicle.
Figure 21:
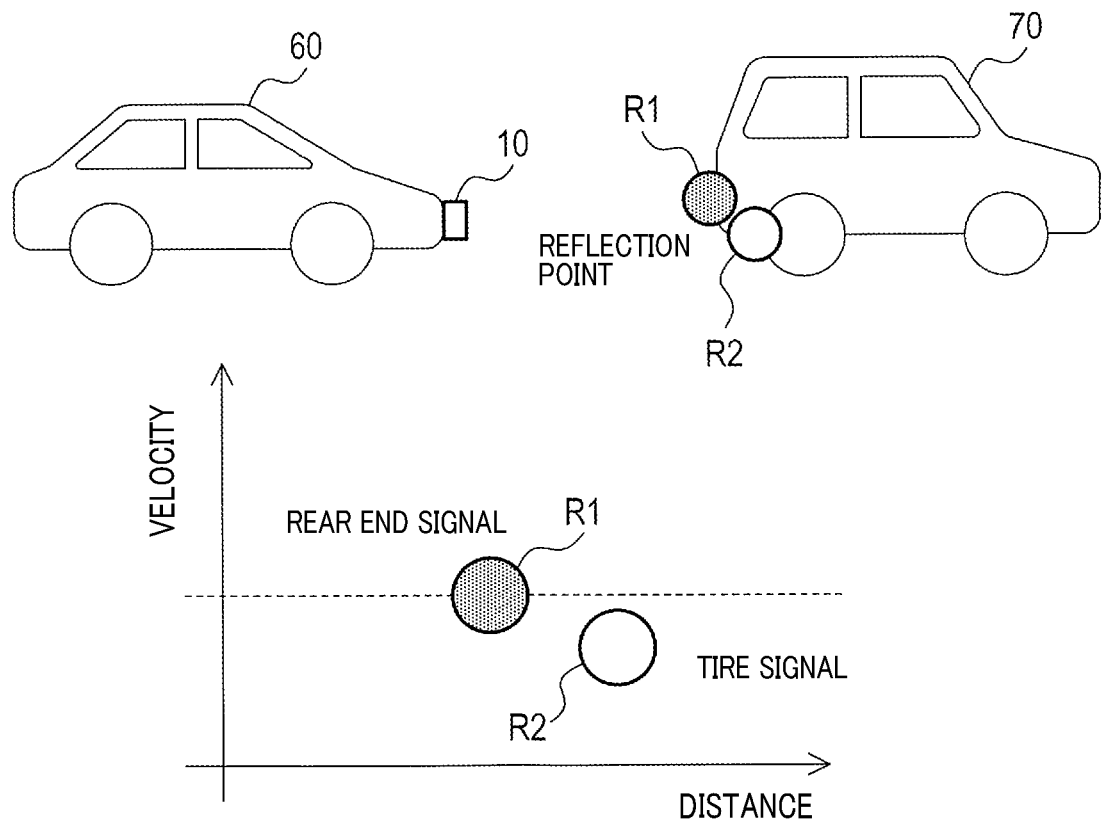
FIG. 21 is a diagram illustrating the rear end signal and the tire signal at a time differing from that in FIG. 20.

As shown in FIG. 20, the radar apparatus 10 may receive a plurality of reflection signals from a preceding vehicle 70 that is traveling ahead of the vehicle 60. The plurality of reflection signals are generated in a plurality of sections of the preceding vehicle 70. For example, the plurality of reflection signals may include a rear end signal R1 and a tire signal R2. The rear end signal R1 is generated at a rear end of the preceding vehicle 70. The tire signal R2 is generated at a tire of the preceding vehicle 70. FIG. 21 shows the rear end signal R1 and the tire signal R2 at a time differing from that in FIG. 20.

The rear end signal R1 is a dominant signal among the plurality of reflection signals. As shown in FIG. 20 and FIG. 21, temporal variation in the velocity measurement value that is calculated from the rear end signal R1 is relatively small. Therefore, a rear end target object Tga that corresponds to the rear end signal R1 is not easily determined to be a folding ghost. Meanwhile, temporal variation in the velocity measurement value that is calculated from the tire signal R2 is relatively large. As a result, the velocity residual is also relatively large. Therefore, a tire target object Tgb that corresponds to the tire signal R2 may be erroneously determined to be a folding ghost regardless of being a target object that is generated from an object that is actually present.

Figure 22:
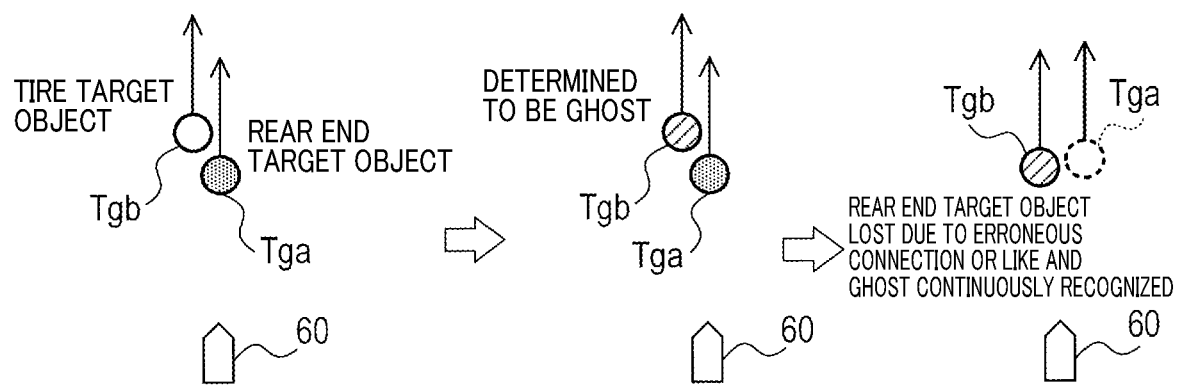
FIG. 22 is a diagram illustrating a state in which a first target object is lost due to erroneous connection and a second target object that is erroneously determined to be a ghost is continuously recognized.

As shown in FIG. 22, after the tire target object Tgb is erroneously determined to be a folding ghost, the rear end target object Tga may be lost as a result of erroneous connection in tracking of the target object or the like. For example, when the number of target objects that are generated from the preceding vehicle 70 decreases in a subsequent processing cycle, the target object prediction value that corresponds to the rear end target object Tga may not be connected to the target object measurement value, and the rear end target object Tga may be lost. In addition, the target object prediction value that corresponds to the tire target object Tgb may be connected to the target object measurement value, and the tire target object Tgb may continue to be present. In such cases, the folding ghost is continuously recognized. Furthermore, vehicle control regarding the preceding vehicle 70 continues to be suppressed.

Therefore, it is determined whether a second object that corresponds to a second target object is same as a first object that corresponds to a first target object. When the second object is determined to be the same as the first object and the first target object is determined to be a non-folding-ghost, the second target object is suppressed from being determined to be a folding ghost.

First, at S810, it is determined whether an unselected target object that has not yet been selected as the first target object is present among the target objects that are being tracked and are present in the current processing cycle. When determined that no unselected target object is present at S810, the processing apparatus 20 ends the present subroutine and proceeds to a process at S900.

Meanwhile, when determined that the unselected target object is present at S810, the processing apparatus 20 proceeds to the process at S820 and selects the first target object from the unselected target objects.

Next, at S830, it is determined whether an unselected target object that has not yet been selected as the second target object is present among the target objects that are being tracked and are present in the current processing cycle. The second target object corresponds to a subject of determination to determine whether the target object corresponds to the same object as the first target object.

When determined that no unselected target object is present at S830, the processing apparatus 20 returns to the process at S810. When determined that the unselected target object is present, the processing apparatus 20 proceeds to the process at S840.

At S840, the second target object is selected from the unselected target objects. Here, a target object that differs from the first target object selected at S810 is selected as the second target object.

Next, at S850, it is determined whether the second object has already been subjected to determination regarding whether the object is the same object as an object that corresponds to another target object. The second object is an object that corresponds to the second target object and the second target object is generated from the second object. The first object described hereafter is an object that corresponds to the first target object and the first target object is generated from the first object. When determined that the second object has already been determined to be the same object at S850, the processing apparatus 20 returns to the process at S830. Meanwhile, when determined that the second object is not yet determined to be the same object at S850, the processing apparatus 20 proceeds to a process at S860.

Next, at S860, it is determined whether a longitudinal position of the second target object is (i) further away than a longitudinal position of the first target object and (ii) a difference in position is equal to or less than a longitudinal threshold. The longitudinal position of the first target object, the longitudinal position of the second target object, and a lateral position described hereafter are calculated from at least one of the target object measurement value, the target object prediction value, and the target object estimation value. The longitudinal position corresponds to a position in an advancing direction of the vehicle 60. The lateral position corresponds to a position in a direction that is orthogonal to the advancing direction of the vehicle 60. In addition, the "further way" in this case corresponds to a side away from the vehicle 60. The difference in position corresponds to a difference between the longitudinal position of the first target object and the longitudinal position of the second target object. The longitudinal threshold is a value that is about a length of a vehicle. When a negative determination is made at S860, the processing apparatus 20 returns to the process at S830. When an affirmative determination is made, the processing apparatus 20 proceeds to a process at S870.

Next, at S870, it is determined whether the difference between the lateral position of the second target object and the lateral position of the first target object is equal to or less than a lateral threshold. The lateral threshold is a value that is about a width of a vehicle. When determined that the difference in lateral position is greater than the lateral threshold at S870, the processing apparatus 20 returns to the process at S830. When determined that the difference in lateral positions is equal to or less than the lateral threshold, the processing apparatus 20 proceeds to a process at S880.

Next, at S880, it is determined whether a difference between the ground velocity of the second target object and the ground velocity of the first target object is equal to or less than a velocity threshold. The velocity threshold corresponds to a threshold for determining whether the ground velocity of the second threshold can be considered to be same as the ground velocity of the first target object. When determined that the difference in ground velocity is greater than the velocity threshold at S880, the processing apparatus 20 returns to the process at S830. When determined that the difference in ground velocity is equal to or less than the velocity threshold, the processing apparatus 20 proceeds to a process at S890.

At S890, the second object is determined to be the same as the first object because the longitudinal position, the lateral position, and the ground velocity of the second target object are respectively sufficiently close to the longitudinal position, the lateral position, and the ground velocity of the first target object. That is, the first target object and the second target object are determined to be generated from the same object.

Figure 18:
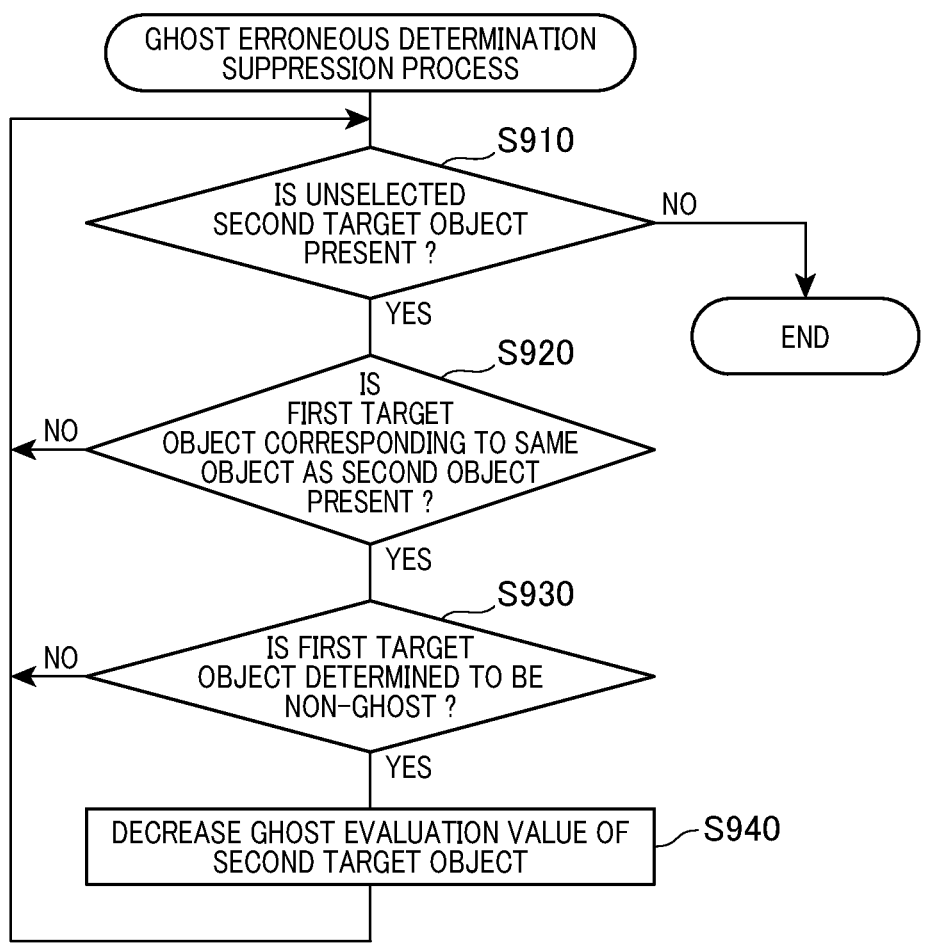
FIG. 18 is a subroutine illustrating a ghost erroneous determination suppression process according to the third embodiment.

Returning to FIG. 16, at S900, the ghost erroneous determination suppression process is performed. Specifically, a subroutine shown in FIG. 18 is performed. As described above, when a plurality of target objects are generated from the same object, a target object that is easily erroneously determined to be a folding ghost may be included in the plurality of target objects. Therefore, when a plurality of target objects are generated from the same object and one target object among the plurality of target objects is determined to be a non-folding-ghost, the remaining target objects is suppressed from being determined to be a folding ghost.

First, at S910, it is determined whether an unselected second target object is present in the ghost erroneous determination suppression process. When determined that no unselected second target object is present at S910, the processing apparatus 20 ends the present subroutine, returns to the target object detection process, and ends the target object detection process. Meanwhile, when determined that an unselected second target object is present at S910, the processing apparatus 20 selects one of the unselected second target objects and proceeds to a process at S920.

At S920, it is determined whether the first target object that corresponds to the first object that is determined to be the same object as the second object is present. The second object herein is an object that corresponds to the second target object selected at S910. When determined that no first target object is present at S920, the processing apparatus 20 returns to the process at S910. When determined that the first target object is present, the processing apparatus 20 proceeds to the process at S930.

At S930, it is determined whether the first target object that is determined to be present at S920 is determined to not be a non-folding-ghost. When not determined to be a non-folding-ghost at S930, the processing apparatus 20 returns to the process at S910. When determined to be a non-folding-ghost at S930, the processing apparatus 20 proceeds to a process at S940.

At S940, the processing apparatus 20 decreases the ghost evaluation value of the second target object selected at S910 and the returns to the process at S910. As a result, the second target object is suppressed from being erroneously determined to be a folding ghost. That is, when one target object among the plurality of target objects that are generated from the same object is determined to be a non-folding-ghost, the remaining target objects is suppressed from being erroneously determined to be a folding ghost.

3-4. Effects

According to the third embodiment described above, following effects can be achieved in addition to the effects (1) to (10) described above.

(11) It is determined whether the second object that corresponds to the second target object is the same as the first object that corresponds to the first target object. In addition, when (i) the first target object is determined to be a non-folding-ghost and (ii) the second object is determined to be the same as the first object, the second target object is suppressed from being determined to be a folding ghost. Consequently, a target object that is generated from an object that is actually present can be suppressed from being erroneously determined to be a folding ghost. Furthermore, a target object that is erroneously determined to be a folding ghost can be suppressed from being continuously recognized.

(12) When the first target object is determined to be a non-folding-ghost and the second object is determined to be the same as the first object, the ghost evaluation value of the second target object is decreased. Consequently, the second target object can be suppressed from being determined to be a folding ghost.

3-5. Other Examples According to the Third Embodiment

Figure 19:
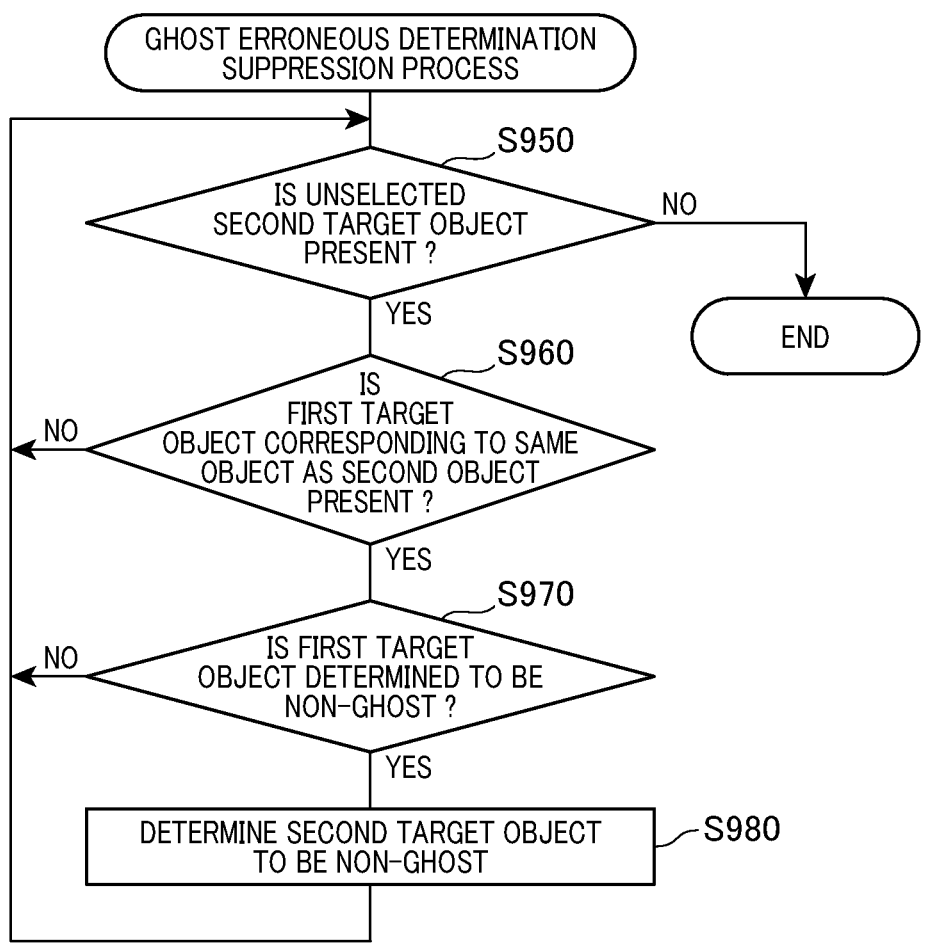
FIG. 19 is a subroutine illustrating another example of the ghost erroneous determination suppression process according to the third embodiment.

Next, another example of the ghost determination suppression process according to the third embodiment will be described with reference to a subroutine in FIG. 19. That is, the processing apparatus 20 according to the third embodiment may perform a subroutine shown in FIG. 19 instead of the subroutine shown in FIG. 18.

First, at S950 to S970, processes similar to those at S910 to S930 of the subroutine shown in FIG. 18 are performed.

When determined to be a non-folding-ghost at S970, the processing apparatus 20 proceeds to a process at S980.

At S980, the second target object selected at S950 is determined to be a non-folding-ghost. As a result, the second target object is prevented from being erroneously determined to be a folding ghost.

As a result of the other example according to the third embodiment described above, following effects can be achieved in addition to the effects (1) to (11) described above.

(13) When (i) the first target object is determined to be a non-folding-ghost and (ii) the second object is determined to be the same as the first object, the second target object is determined to be a non-folding-ghost. Consequently, the second target object can be prevented from being determined to be a folding ghost.

Fourth Embodiment 4-1. Differences from the Third Embodiment

A basic configuration according to a fourth embodiment is similar to that according to the third embodiment. Therefore, descriptions of shared configurations are omitted. Differences are mainly described. Here, reference numbers that are the same as those according to the third embodiment indicate identical configurations. Earlier descriptions are referenced.

According to the third embodiment, the ghost erroneous determination suppression process is performed when a plurality of target objects are generated from the same object. In contrast, the fourth embodiment differs from the third embodiment in that a tracking suppression process is performed when a plurality of target objects are generated from the same object. That is, according to the third embodiment, when (i) a plurality of target objects are generated from the same object and (ii) one of the plurality of target objects is determine to be a non-folding-ghost, the remaining target objects being erroneously determined to be a folding ghost is suppressed. As a result, a target object that is erroneously determined to be a folding ghost being continuously recognized is suppressed. In contrast, according to the fourth embodiment, when (i) a plurality of target objects are generated from the same object and (ii) one of the plurality of target objects is determine to be a non-folding-ghost, a target object that is determined to be a folding ghost among the plurality of target objects is suppressed from being tracked. As a result, a target object that is erroneously determined to be a folding ghost is suppressed from being continuously recognized.

4-2. Processes

Figure 23:
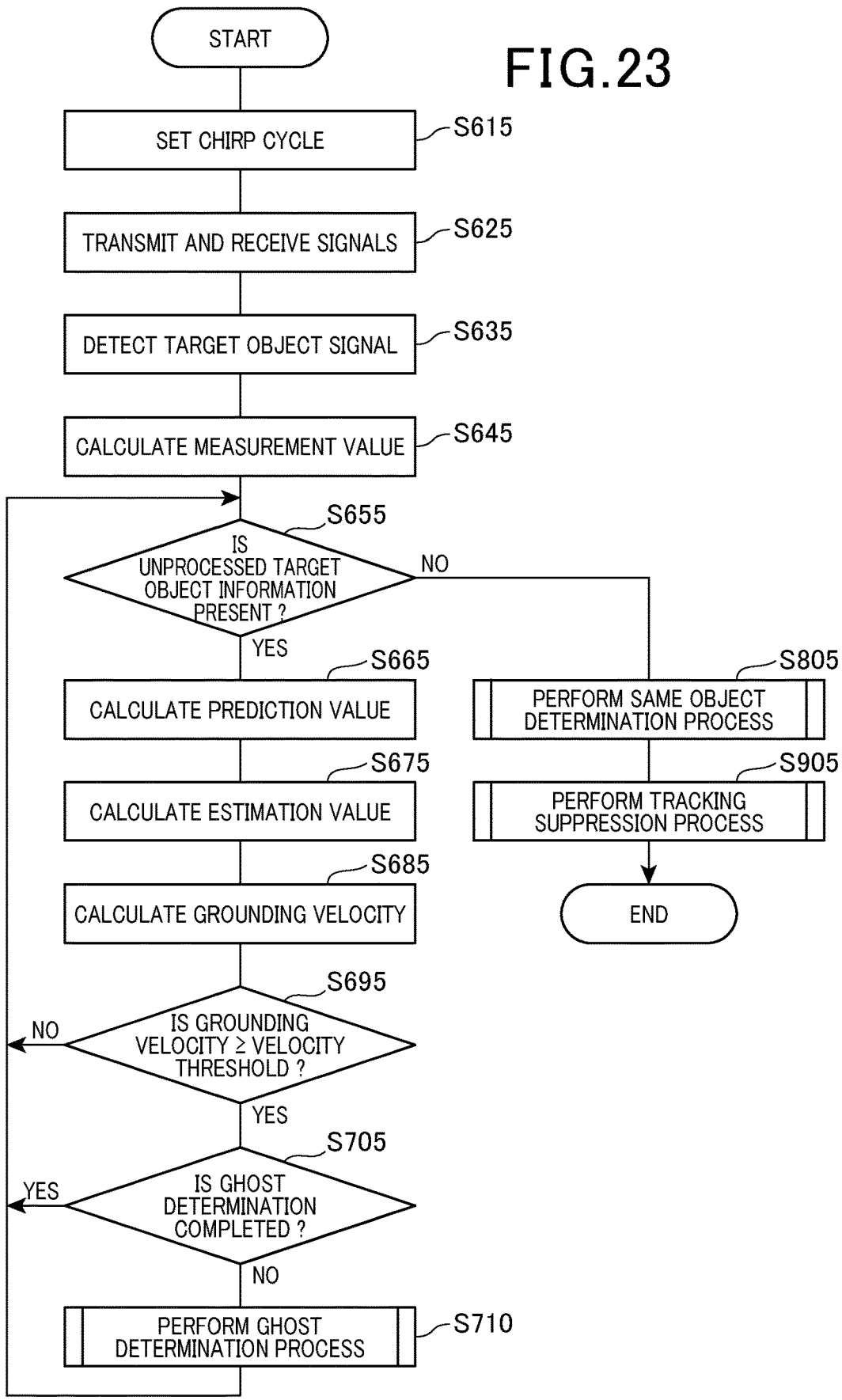
FIG. 23 is a flowchart illustrating a target object detection process according to a fourth embodiment.

Next, a target object detection process performed by the processing apparatus 20 according to the fourth embodiment will be described with reference to a flowchart in FIG. 23.

Figure 16:
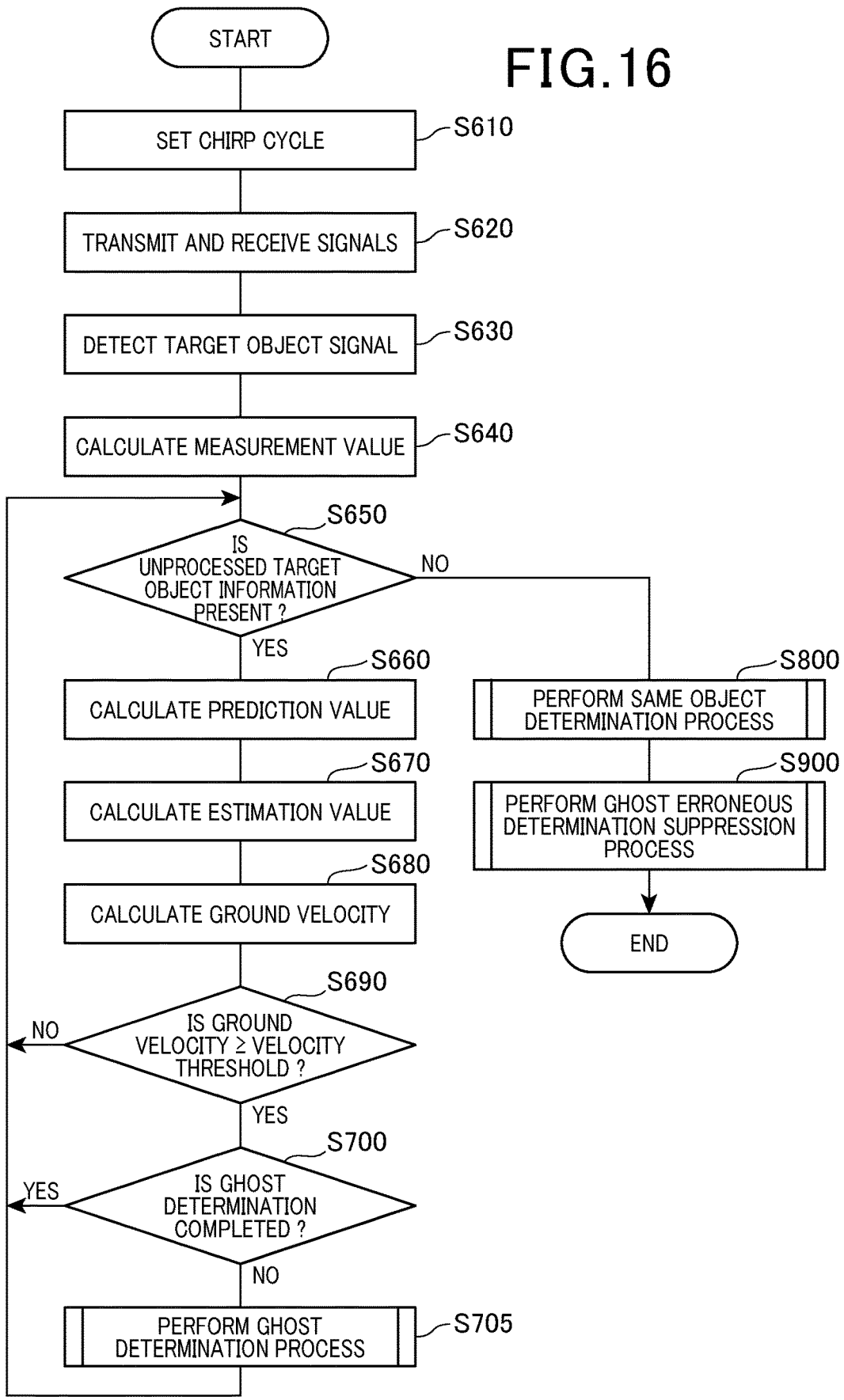
FIG. 16 is a flowchart illustrating a target object detection process according to a third embodiment.

First, at S615 to S805, processes that are similar to those at S610 to S800 in FIG. 16 are performed.

Next, at S905, the tracking suppression process is performed. Specifically, a subroutine shown in FIG. 24 is performed.

First, at S915 to S935, processes similar to those at S910 to S930 of the subroutine shown in FIG. 18 are performed.

When determined that the first target object is a non-folding-ghost at S935, the processing apparatus 20 proceeds to a process at S945.

At S945, it is determined whether the second target object is determined to be a folding ghost. When determined that the second target object is not a folding ghost at S945, the processing apparatus 20 returns to the process at S915. When determined that the second target object is a folding ghost, the processing apparatus 20 proceeds to a process at S955.

At S955, the processing apparatus 20 reduces an association range of the second target object and returns to the process at S915. The association range is a range within which the target object prediction value and the target object measurement value are associated. In particular, of the association range, a velocity range is reduced. The velocity is a range within which the velocity prediction value and the velocity measurement value are associated. When at least a condition that a difference between the velocity prediction value and the velocity measurement value is within the velocity range is met, the target object prediction value and the target object measurement value are associated. As a result of the association range being reduced, the target object prediction value and the target object measurement value are suppressed from being associated with each other. Consequently, the second target object is suppressed from being tracked.

3-4. Effects

According to the fourth embodiment described above, following effects are achieved in addition to the effects (1) to (10) described above.

(14) It is determined whether the second object is the same as the first object. Then, when (i) the first target object is determined to be a non-folding-ghost, (ii) the second object is determined to be the same as the first object, and (iii) the second target object is determined to be a folding ghost, the second object is suppressed from being tracked. Consequently, a target object that is erroneously determined to be a folding ghost can be suppressed from being tracked. Furthermore, a target object that is erroneously determined to be a folding ghost can be suppressed from being continuously recognized.

(15) When (i) the first target object is determined to be a non-folding-ghost, (ii) the second object is determined to be the same as the first object, and (iii) the second target object is determined to be a folding ghost, the association range is narrowed. Consequently, the second target object can be suppressed from being tracked.

(16) When (i) the first target object is determined to be a non-folding-ghost, (ii) the second object is determined to be the same as the first object, and (iii) the second target object is determined to be a folding ghost, the velocity range in particular is narrowed. Consequently, the second object can be favorably suppressed from being tracked.

4-3. Other Examples According to the Fourth Embodiment

Next, another example of the tracking suppression process according to the fourth embodiment will be described with reference to a subroutine in FIG. 25. That is, the processing apparatus 20 according to the fourth embodiment may perform the subroutine in FIG. 25 instead of the subroutine in FIG. 24.

First, at S958 to S988, processes similar to those at S915 to S945 of the subroutine shown in FIG. 24 are performed.

When the second target object is determined to be a ghost at S988, the processing apparatus 20 proceeds to a process at S998.

At S998, the second target object selected at S958 is eliminated from the target objects that are being tracked in the current processing cycle. As a result, the second target object is prevented from being tracked.

As a result of the other example according to the fourth embodiment described above, following effects can be achieved in addition to the effects (1) to (10) and (14) described above.

When (i) the first target object is determined to be a non-folding-ghost, (ii) the second object is determined to be the same as the first object, and (iii) the second target object is determined to be a folding ghost, the second target object is eliminated. Consequently, the second target object can be prevented from being tracked.

Other Embodiments

Embodiments for carrying out the present disclosure are described above. However, the present disclosure is not limited to the above-described embodiments and various modifications are possible.

(a) According to the above-described embodiments, the radar apparatus 10 alternately transmits the M first chirp signals and the N second chirp signals of which the repetition cycles differ from each other. However, the radar apparatus 10 may transmit pulse signals instead of chirp signals. That is, the radar apparatus 10 may alternately transmit M first pulse signals and N second pulse signals of which repetition cycles differ from each other.

(b) The radar apparatus 10 and a method for implementing functions thereof described in the present disclosure may be implemented by a dedicated computer that is provided so as to be configured by a processor and a memory, the processor being programmed to provide a single or a plurality of functions that are realized by a computer program. Alternatively, the radar apparatus 10 and a method for implementing functions thereof described in the present disclosure may be implemented by a dedicated computer that is provided by a processor being configured by a single or a plurality of dedicated hardware logic circuits. Alternatively, the radar apparatus 10 and a method for implementing functions thereof described in the present disclosure may be implemented by one or more dedicated computers that are configured by a combination of a processor that is programmed to provide a single or a plurality of functions, a memory, and a processor that is configured by one or more hardware logic circuits. In addition, the computer program may be stored in a non-transitory computer-readable (tangible) storage medium that can be read by a computer as instructions performed by the computer. A method for implementing functions of sections included in the radar apparatus 10 is not necessarily required to include software. All of the functions may be implemented through use of a single or a plurality of pieces of hardware.

(c) A plurality of functions provided by a single constituent element according to the above-described embodiments may be implemented by a plurality of constituent elements. A single function provided by a single constituent element may be implemented by a plurality of constituent elements. In addition, a plurality of functions provided by a plurality of constituent elements may be implemented by a single constituent element. A single function provided by a plurality of constituent elements may be implemented by a single constituent element. Furthermore, a part of a configuration according to the above-described embodiment may be omitted. Moreover, at least a part of a configuration according to an above-described embodiment may be added to or replace a configuration according to another of the above-described embodiments.

(d) The present disclosure can also be implemented by various modes in addition to the above-described radar apparatus, such as a system in which the radar apparatus is a constituent element, a program for enabling a computer to function as the radar apparatus, a non-transitory computer-readable (tangible) storage medium such as a semiconductor memory that records the program therein, and an object tracking method.

What is claimed is:

1. A radar apparatus that is mounted to a vehicle, the radar apparatus comprising:
   a transmitting unit that is configured to transmit a transmission signal at a repetition cycle that is set, the transmission signal being a pulse signal or a chirp signal;
   a receiving unit that is configured to receive a reflection signal that is generated by the transmission signal transmitted by the transmitting unit being reflected by at least one object;
   a setting unit that is configured to set the repetition cycle that differs from the repetition cycle of a preceding processing cycle as the repetition cycle of a next processing cycle;
   a detecting unit that is configured to detect at least one target object signal that corresponds to at least one target object from the reflection signal received by the receiving unit;
   a measuring unit that is configured to calculate at least one target object measurement value from the at least one target object signal detected by the detecting unit, each of the at least one target object measurement value including, as an element, a velocity measurement value that takes into consideration velocity folding of the at least one target object;
   a target object tracking unit that is configured to track each of the at least one target object from a time series of each of the at least one target object measurement value calculated by the measuring unit, the target object tracking unit including
      a predicting unit that is configured to calculate a target object prediction value that corresponds to a current state of each of the at least one target object from a target object estimation value that corresponds to a past state of each of the at least one target object, and
      an estimating unit that is configured to associate the target object prediction value with the target object measurement value and calculate the target object estimation value that corresponds to the current state of each of the at least one target object, based on the target object prediction value and the target object measurement value that are associated with each other, the target object prediction value including a velocity prediction value as an element;
   a residual calculating unit that is configured to calculate a velocity residual of each of the at least one target object, the velocity residual being a difference between the velocity prediction value and the velocity measurement value;
   an evaluating unit that is configured to calculate an evaluation value of each of the at least one target object based on a magnitude of variation in the velocity residual in time series of each of the at least one target object, the evaluation value corresponding to a probability of each of the at least one target object being a folding ghost; and
   a ghost determining unit that is configured to determine whether each of the at least one target object is a folding ghost based on the evaluation value of each of the at least one target object.

2. The radar apparatus according to claim 1, wherein:
   the evaluating unit is configured to calculate dispersion of the velocity residuals in time series as the evaluation value.

3. The radar apparatus according to claim 1, wherein:
   the evaluating unit is configured to calculate a residual change amount as the magnitude of variation in the velocity residual, and increase or decrease the evaluation value based on the calculated residual change amount,
      the residual change amount being an absolute value of a difference between the velocity residual in the current processing cycle and the velocity residual in a previous processing cycle.

4. The radar apparatus according to claim 3, wherein:
   the evaluating unit is configured to increase the evaluation value, in response to the residual change amount being equal to or greater than a first threshold.

5. The radar apparatus according to claim 4, wherein:
   the evaluating unit is configured to decrease the evaluation value, in response to the residual change amount being equal to or less than a second threshold that is less than the first threshold.

6. The radar apparatus according to claim 5, wherein:
   the ghost determining unit is configured to determine, in response to the evaluation value being equal to or greater than a third threshold, a target object that corresponds to the evaluation value among the at least one target object to be a folding ghost.

7. The radar apparatus according to claim 6, wherein:
   the ghost determining unit is configured to determine, in response to the evaluation value being equal to or greater than a fourth threshold that is less than the third threshold, a target object that corresponds to the evaluation value among the at least one target object to be a non-ghost.

8. The radar apparatus according to claim 7, wherein:
   each of the at least one target object measurement value includes an measurement orientation;
   the measuring unit is configured to calculate a detection velocity from each of the at least one target object signal and calculate the velocity measurement value from the calculated detection velocity and a selected number of times of folding;

the radar apparatus further includes a stationary object velocity calculating unit that is configured to calculate a stationary object velocity of each of the at least one target object, in response to each of the at least one target object being assumed to be a stationary object, from a velocity of the vehicle and the measurement orientation of each of the at least one target object;

the evaluating unit is configured to increase the evaluation value, in response to the detection velocity coinciding with the stationary object velocity.

9. The radar apparatus according to claim 8, wherein:

each of the at least one target object measurement value includes an measurement orientation;

the radar apparatus further includes a ground velocity calculating unit that is configured to calculate a ground velocity of each of the at least one target object from a velocity of the vehicle and the measurement orientation of each of the at least one target object; and the evaluating unit is configured to set, in response to the ground velocity being equal to or greater than a velocity threshold, a target object that corresponds to the ground velocity among the at least one target object to be subjected to determination regarding whether the target object is a folding ghost.

10. The radar apparatus according to claim 1, wherein:

the at least one target object includes a first target object and a second target object that differs from the first target object;

the at least one object includes a first object that corresponds to the first target object and a second object that corresponds to the second target object; and the radar apparatus includes
- a same object determining unit that is configured to determine whether the second object is same as the first object based on (a) at least one of a position measurement value included in the target object measurement value, a position prediction value included in the target object prediction value, and a position estimation value of each of the first target object and the second target object included in the target object estimation value, and (b) at least one of the velocity measurement value, the velocity prediction value, and a velocity estimation value of each of the first target object and the second target object included in the target object estimation value, and
- a determination suppressing unit that is configured to suppress the second target object from being determined to be a folding ghost by the ghost determining unit, in response to (i) the first target object being determined to be a non-folding-ghost by the ghost determining unit, and (ii) the second object being determined to be the same as the first object by the same object determining unit.

11. The radar apparatus according to claim 1, wherein:

the at least one target object includes a first target object and a second target object that differs from the first target object;

the at least one object includes a first object that corresponds to the first target object and a second object that corresponds to the second target object; and the radar apparatus includes
- a same object determining unit that is configured to determine whether the second object is same as the first object based on (a) at least one of a position measurement value included in the target object measurement value, a position prediction value included in the target object prediction value, and a position estimation value of each of the first target object and the second target object included in the target object estimation value, and (b) at least one of the velocity measurement value, the velocity prediction value, and a velocity estimation value of each of the first target object and the second target object included in the target object estimation value, and
- a tracking suppressing unit that is configured to suppress the second target object from being tracked by the target object tracking unit, in response to (i) the first target object being determined to be a non-folding-ghost by the ghost determining unit, (ii) the second object being determined to be the same as the first object by the same object determining unit, and (iii) the second target object being determined to be a folding ghost by the ghost determining unit.

12. The radar apparatus according to claim 10, wherein:

the determination suppressing unit is configured to decrease the evaluation value of the second target object, in response to (i) the first target object being determined to be a non-folding-ghost by the ghost determining unit, and (ii) the second object being determined to be the same as the first object by the same object determining unit.

13. The radar apparatus according to claim 10, wherein:

the determination suppressing unit is configured to determine the second target object to be a non-folding-ghost, in response to (i) the first target object being determined to be a non-folding-ghost by the ghost determining unit, and (ii) the second object being determined to be the same as the first object by the same object determining unit.

14. The radar apparatus according to claim 11, wherein:

the estimating unit is configured to associate the target object prediction value and the target object measurement value, in response to a difference between the target object prediction value and the target object measurement value being within an association range that is set; and the tracking suppressing unit is configured to narrow the association range, in response to (i) the first target object being determined to be a non-folding-ghost by the ghost determining unit, (ii) the second object being determined to be the same as the first object by the same object determining unit, and (iii) the second target object being determined to be a folding ghost by the ghost determining unit.

15. The radar apparatus according to claim 14, wherein:

the association range includes a velocity range for associating the velocity prediction value with the velocity measurement value; and the tracking suppressing unit is configured to narrow the velocity range, in response to (i) the first target object being determined to be a non-folding-ghost by the ghost determining unit, (ii) the second object being determined to be the same as the first object by the same object determining unit, and (iii) the second target object being determined to be a folding ghost by the ghost determining unit.

16. The radar apparatus according to claim 11, wherein:

the tracking suppressing unit is configured to eliminate the second target object, in response to (i) the first target object being determined to be a non-folding-ghost by the ghost determining unit, (ii) the second object being determined to be the same as the first object by the same object determining unit, and (iii) the second target object being determined to be a folding ghost by the ghost determining unit.

17. The radar apparatus according to claim 1, further comprising:
a vehicle control unit that is configured to output a control command based on each of the at least one target object to a traveling assistance apparatus that assists traveling of the vehicle, wherein
the vehicle control unit is configured to suppress, in response to any of the at least one target object being determined to be a folding ghost by the ghost determining unit, output of the control command based on a target object that is determined to be the folding ghost among the at least one target object.

18. The radar apparatus according to claim 1, wherein:
the ghost determining unit is configured to determine, in response to the evaluation value being equal to or greater than a third threshold, a target object that corresponds to the evaluation value among the at least one target object to be a folding ghost.

19. The radar apparatus according to claim 1, wherein:
each of the at least one target object measurement value includes an measurement orientation;
the measuring unit is configured to calculate a detection velocity from each of the at least one target object signal and calculate the velocity measurement value from the calculated detection velocity and a selected number of times of folding;
the radar apparatus further includes a stationary object velocity calculating unit that is configured to calculate a stationary object velocity of each of the at least one target object, in response to each of the at least one target object being assumed to be a stationary object, from a velocity of the vehicle and the measurement orientation of each of the at least one target object;
the evaluating unit is configured to increase the evaluation value, in response to the detection velocity coinciding with the stationary object velocity.

20. The radar apparatus according to claim 1, wherein:
each of the at least one target object measurement value includes an measurement orientation;
the radar apparatus further includes a ground velocity calculating unit that is configured to calculate a ground velocity of each of the at least one target object from a velocity of the vehicle and the measurement orientation of each of the at least one target object; and
the evaluating unit is configured to set, in response to the ground velocity being equal to or greater than a velocity threshold, a target object that corresponds to the ground velocity among the at least one target object to be subjected to determination regarding whether the target object is a folding ghost.

* * * * *